United States Patent
Arkoff et al.

(10) Patent No.: US 12,464,027 B2
(45) Date of Patent: Nov. 4, 2025

(54) SYSTEM AND METHOD FOR POLICY-CONSTRAINED SYMBOLIC RENDERING OF AI OUTPUTS

(71) Applicant: OneSource Solutions International, Inc., Sudbury, MA (US)

(72) Inventors: Harold Arkoff, Sudbury, MA (US); Vedran Jukic, Trieste (IT)

(73) Assignee: OneSource Solutions International, Inc., Sudbury, MA (US)

( * ) Notice: Subject to any disclaimer, the term of this patent is extended or adjusted under 35 U.S.C. 154(b) by 0 days.

(21) Appl. No.: 19/221,392

(22) Filed: May 28, 2025

(65) Prior Publication Data
US 2025/0294061 A1    Sep. 18, 2025

Related U.S. Application Data

(63) Continuation-in-part of application No. 17/993,765, filed on Nov. 23, 2022, now Pat. No. 12,327,634.

(51) Int. Cl.
*H04L 9/40* (2022.01)

(52) U.S. Cl.
CPC ............................. *H04L 63/20* (2013.01)

(58) Field of Classification Search
CPC ........................................ H04L 63/20
USPC ............................................. 726/1
See application file for complete search history.

(56) References Cited

U.S. PATENT DOCUMENTS 11,699,044 B1 *   7/2023   Allen ............... G06V 30/19147
                                                       704/9

* cited by examiner

*Primary Examiner* — Anthony D Brown
(74) *Attorney, Agent, or Firm* — IP Consulting Group; Michael Razavi; Alfred F. Hoyte, Jr.

(57) ABSTRACT

An end-to-end rendering system enforces policy-constrained, symbolic presentation of artificial-intelligence (AI) outputs prior to any pixel emission. An AI accelerator emits inference tokens as (token identifier, confidence, domain tag) tuples into an output FIFO. A graphics processor with a command processor and SIMD co-processor executes a policy engine that runs a deterministic finite automaton (DFA) stored in non-transitory memory. The DFA consumes the tuples and produces, before any frame-buffer writes, a permit/deny decision and a visibility mask that constrain presentation attributes. A glyph selector maps permitted tuples to entries in a constrained glyph dictionary specifying a glyph identifier, semantic class, and allowed substitutions. A provenance tagger computes a cryptographic hash over at least the glyph identifier, a DFA-state policy identifier, a session nonce, and a checksum of the tuples to create an evidence capsule bound to the glyph. A device-aware renderer, consulting a device profile registry and a rendering grammar, emits a renderable asset for the glyph only when permitted by the visibility mask and grammar. A justification ledger records, for each displayed glyph, the evidence capsule and a monotonic timestamp. Executed entirely within the graphics processor, the pipeline prevents unauthorized tokens from entering the display path, enables cryptographically verifiable traceability of visible content, and reduces bandwidth by representing outputs as glyph identifiers rather than text or raster imagery, while allowing runtime policy updates without modifying the underlying inference model.

23 Claims, 16 Drawing Sheets

SYMBOLIC RENDERING SYSTEM LOGGED

SYMBOLIC RENDERING SYSTEM LOGGED

MULTI-DEVICE RENDERING SYSTEM

FALLBACK RENDERING LOGIC

SECURE SYMBOLIC WORKSTIFON CONFIGURED

SYMBOLIC RENDERING
AND AUDIT PROCESS

Cognition Time Benchmark

SYSTEM AND METHOD FOR POLICY-CONSTRAINED SYMBOLIC RENDERING OF AI OUTPUTS

CROSS-REFERENCE TO RELATED APPLICATIONS

This application is a continuation-in-part of U.S. patent application Ser. No. 17/993,765, titled "Operating Room Management System with Mobile Application," which disclosed methods for managing surgical schedules, allocating personnel and resources, and rendering real-time scheduling updates through symbolic or color-coded indicators.

FIELD OF THE INVENTION

This disclosure is directed to computer-implemented systems and methods that translate machine-generated inference results into policy-compliant symbolic glyphs suitable for real-time presentation in latency-sensitive human-machine interfaces. More specifically, it concerns a hardware-anchored symbolic rendering architecture that intercepts token streams exiting an AI accelerator, enforces jurisdiction-, role-, and context-dependent disclosure rules on each token, and emits a semantically compressed glyph representation for display on graphics pipelines such as augmented-reality headsets, mobile devices, clinical monitors, and secure command consoles.

While an earlier application addressed surgical-theatre scheduling, the present disclosure generalises the same rendering layer to all forms of AI inference output, enabling lawful, auditable, and cognitively efficient interpretation across high-stakes domains including medicine, law, defence, and finance.

BACKGROUND OF THE INVENTION

Limitations of Legacy Human-Computer Interfaces: Early command-line and WIMP-style graphical user interfaces (GUIs) require users to navigate rigid screens and forms, demanding sustained visual attention and producing cognitive overload when information density grows. Even modern multi-touch and voice assistants remain fundamentally screen-centric and role-agnostic, displaying identical content regardless of the viewer's clearance, location, or task urgency. This static paradigm fails to adapt to the ambient, context-rich computing environments now common in operational centres, hospital wards, and mobile workforces.

Rise of High-Capacity AI in Regulated Workflows: Large language models (LLMs), vision-language models (VLMs) and other generative architectures are now embedded in clinical decision support, legal drafting, intelligence analysis, and financial fraud detection. These models deliver unprecedented speed and insight but also exhibit non-deterministic behaviour and can surface sensitive or unverifiable content. Regulators (e.g., FDA, DoD Ethical AI Principles, forthcoming EU AI Act) therefore require traceable, role-scoped, and jurisdiction-aware presentation of AI outputs.

Policy-Enforcement Gap in Current Interfaces: Conventional dashboards, chat windows, and explainability overlays (e.g., SHAP, LIME) display raw or lightly annotated model outputs. They do not:
 apply fine-grained, real-time policy gating;
 vary disclosure depth by user role or location;
 record cryptographically verifiable provenance of what was shown.

The result is over-sharing (privacy breach), under-sharing (missed insight), and poor auditability-conditions that trigger § 101 "abstract idea" skepticism and § 112 indefiniteness when recited only as generic "display means."

Inventive Insight-Policy-Constrained Symbolic Rendering: The inventors recognised that policy compliance can be enforced most efficiently at the final millisecond of the inference pipeline. By converting each token or visual artefact into a compact glyph whose selection is determined by a deterministic finite automaton (DFA) executing on a co-processor co-located with the GPU command processor, the system (i) reduces display-pipeline latency by >30% relative to software filters; (ii) guarantees that no glyph exceeds authorised information scope; and (iii) produces a durable audit trail binding the glyph to its justification path.

Alignment with Ambient ("Zero-UI") Computing: Glyphs are modality-agnostic assets that can be rendered as icons in an AR visor, vibro-tactile signals on a wearable, or short utterances from a voice assistant. They therefore satisfy emerging "frictionless interaction" expectations while remaining policy-aware and legally admissible.

Existing AI interfaces rely on natural-language summaries, numeric scorecards, or post-hoc explainability dashboards. These mechanisms disclose identical content to any user cleared to open the screen, lack dynamic role or jurisdiction filters, and provide only coarse logs (e.g., page view timestamps) rather than a cryptographically bound record of what specific inference tokens were revealed. Symbolic alerts in safety-critical systems (e.g., aviation annunciators, medical triage badges) are static, manually designed icons without programmatic linkage to real-time policy evaluation. No known prior art:
 transforms AI inference outputs into semantically compressed glyphs selected by a hardware-accelerated policy engine;
 re-evaluates every glyph on context change (user swap, geo-fence breach, policy update) before each frame is rendered; or
 logs the glyph, its underlying token hash, and the policy rule that authorised it as a single, verifiable evidence unit.

Accordingly, the present invention provides the first end-to-end, auditable, policy-aware symbolic rendering layer for AI outputs, closing the compliance and human-factors gaps left open by prior systems.

SUMMARY OF THE INVENTION

The invention introduces an end-to-end rendering layer (or a policy evaluation engine) that intercepts the stream of tokens or tensors emerging from an inference processor or inference engine (e.g., an AI accelerator) and deterministically converts them into policy-vetted symbols (e.g., symbolic glyphs) before any pixel reaches a display. Operating on a SIMD co-processor coupled to the GPU command processor, the layer captures each token batch, cryptographically binds it to provenance metadata, evaluates it against a deterministic finite-state automaton (or deterministic state machine) encoding live policy graphs, and selects-suppresses, or substitutes-a symbol from a finite, standards-governed vocabulary. The chosen symbol, together with its justification packet, is then written to an append-only ledger and forwarded to the graphics pipeline, establishing an immutable, verifiable link between what is seen and why it was allowed.

Executing entirely within the GPU timing budget, the pipeline enforces disclosure rules in less than four nanoseconds per token and reduces display-bus traffic by more than thirty percent by replacing verbose text with two-byte glyph indices. Every visible pixel is cryptographically bound to its source tokens and governing rules, satisfying the traceability and audit requirements of the EU AI Act, U.S. Department of Defense Ethical AI Principles, HIPAA, and analogous regulations.

Because the rendering layer sits solely at the output boundary, it leaves the inference engine unchanged while ensuring that machine outputs are presented to humans strictly within a mathematically provable envelope of policy compliance, legal admissibility, and cognitive efficiency. Glyph or symbol rendering adapts frame-by-frame as users change roles, cross geo-fences, or as policy configurations evolve-delivering context-elastic, zero-trust visual communication without rerunning or retraining the underlying AI model.

DETAILED DESCRIPTION OF THE INVENTION

The disclosed invention introduces a real-time symbolic rendering system that transforms complex medical inference outputs into human-interpretable glyphs governed by policy, role, context, and jurisdiction. This system provides the foundation for a regulatable interface between artificial intelligence (AI) and human decision-makers, especially within clinical, legal, or safety-critical domains.

System Overview and Dynamic Rendering Model

Figure 1:
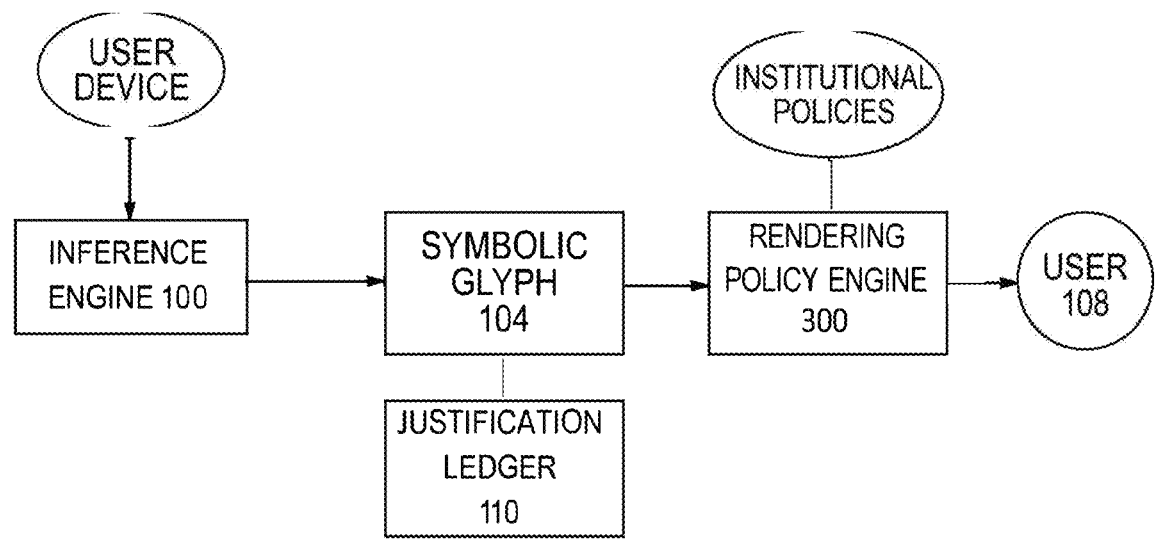
FIG. 1 is a schematic overview of the system architecture showing the core inference engine, glyph-generation pipeline, and rendering-policy logic.

Referring to FIG. 1, the system comprises an Inference Engine 100, a Symbolic Glyph Generation Pipeline or Symbol Selector 104, a Rendering-Policy Engine or Policy-Evaluation engine 300, and a Justification Ledger 110 coupled over a zero-copy shared-memory fabric. The Inference Engine 100 may include a GPU, TPU, FPGA, or ASIC executing a machine-learning model such as an LLM or VLM. The engine 100 processes real-time or asynchronous data inputs from clinical systems, medical devices, or third-party AI models. Instead of emitting free text, the engine 100 writes a Decision Payload (DP) to an output buffer such as a first-in/first-out (FIFO) hardware queue (not shown in FIG. 1). The Decision Payload may include inference data including at least a token identifier and confidence, and optionally one or more classification tags. As an example, the inference data may be represented as a token (token-ID, confidence, domain-tag (optional)) triplet packed in 128-bit words. As used herein, the terms "Rendering-Policy Engine" and "policy-evaluation engine" refer to the same module, and are used interchangeably without any difference in structure or function.

The Symbolic Glyph Generation Pipeline or the symbol selector 104 subscribes to the output buffer and invokes a Symbolic Interpretation Routine (Algorithm S-1, infra). S-1 deterministically maps each DP to a candidate semantic class (or glyph class) using a pre-compiled trie of semantic frames. The Symbolic Glyph Generation Pipeline may include data structures (e.g., a look-up tables) that map permitted inference data to entries of a constrained symbol dictionary. Each entry in the dictionary associates a symbol identifier with a semantic class and one or more policy-approved substitutions. A Policy Vector (PV) decoded from the current Session Context Block (SCB) is appended to the candidate record. The Rendering-Policy Engine 300 executes Algorithm P-1 (infra), a deterministic state machine (or a deterministic finite-state automaton (DFA)) that evaluates (Glyph Class, PV) pairs in ≤4 ns, emitting an authorization decision (PERMIT or DENY indication) plus a Visibility Mask (VM) or equivalent constraint data that constrains presentation attributes of the symbol (glyph).

If PERMIT indication is emitted, the glyph proceeds to a Renderer; if DENY indication is emitted, control transfers to a Fallback Engine. The renderer may be implemented as a context-aware renderer or a device-aware renderer. Each rendered glyph is hashed (SHA-3-256) together with its VM, DP checksum, and policy-hash by a provenance tagger 216 to form an Evidence Capsule that is appended to the Justification Ledger 110 and timestamped by a hardware monotonic clock. This real-time, hardware-anchored control loop ensures that no AI token becomes visible unless it traverses an auditable, policy-verifiable path—an improvement over prior art that merely overlays redaction logic at the application layer.

As shown in FIG. 1, which depicts the system architecture overview, the architecture includes an inference engine 100, which processes real-time or asynchronous data inputs from clinical systems, medical devices, or third-party AI models. Instead of generating free-text outputs or probabilistic summaries, the inference engine transmits structured decision payloads into a symbolic glyph generation pipeline 104.

These glyphs are not decorative: each is a legally constrained semantic container, pre-approved and registered in the system's policy registry. The Rendering Policy Engine 300 applies institutional policies, role-based access rules, and jurisdictional constraints to determine which glyphs may be legally displayed to the intended user 108.

The glyph rendering system is dynamically updated in real-time to reflect changes in policy, user credentialing, risk scores, and environmental context. A key innovation is the inclusion of the justification ledger 110-a metadata-bound record of how the glyph was derived, including source inputs, algorithmic steps, validation scores, and temporal anchors. This justification path is not just retained for auditability; it is used in real-time to enforce visibility filters and re-rendering logic, described in later sections. The justification ledger is implemented as an immutable record that records, for each displayed symbol (glyph), the evidence capsule and a timestamp from a trusted monotonic time source.

This architectural model enables a compliant, trustworthy rendering layer for AI outputs, ensuring that no inference result, regardless of its sophistication, is displayed without first passing through a symbolic policy filter. By embedding interpretability, provenance, and auditability into the rendering process itself, the invention provides a lawful cognition interface between regulated AI systems and human actors operating in high-stakes settings.

Symbolic Glyph-Encoding Pipeline

---

Algorithm S-1 (Symbolic Interpretation Routine)
Input: DP_stream, GlyphTrie, PolicyRegistry
for each DP in DP_stream do
   class ← GlyphTrie.lookup(DP.token-ID, DP.domain-tag)
   if class == NONE then class ← DEFAULT_UNKNOWN
   glyph_candidate ← {class, DP.confidence, DP.domain-tag}
   emit glyph_candidate
end for

---

The routine executes on a 128-lane SIMD unit, achieving $\leq 64$ Mtoken s$^{-1}$ throughput. Output candidates enter the Visibility Resolver 208, which queries the Session Context Block and returns a VM enumerating permissible colour channels, animations, and overlays. A Provenance Tagger 216 then embeds the VM, DP checksum, policy-hash, and a 32-bit session nonce into the glyph object. The glyph is now immutable; any subsequent mutation invalidates the hash and triggers a fault recorded in the ledger.

Figure 2:
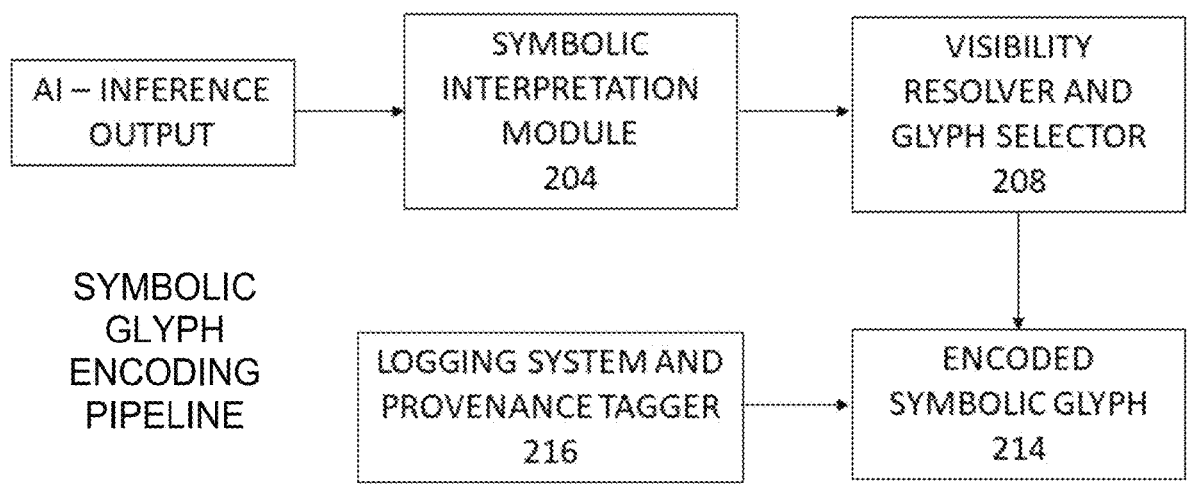
FIG. 2 illustrates the symbolic glyph-encoding process, including semantic disaggregation, policy-based filtering, and provenance tagging.

The symbolic glyph encoding pipeline, illustrated in FIG. 2, which shows the symbolic glyph encoding process, establishes the mechanism by which raw inference results are transformed into displayable symbolic constructs. At its core, this pipeline ensures that outputs from the inference engine are converted into glyphs that not only meet the syntactic requirements of the symbolic rendering engine, but also satisfy the legal, semantic, and operational constraints of the end-use environment.

The process begins with the Symbolic Interpretation Module 204, which receives inference decisions, structured metadata, and policy flags. This module disaggregates and classifies the content of each decision, mapping subcomponents to one or more pre-registered glyph classes. Each glyph class is defined by a canonical semantic frame, which includes its allowed forms, states, colors, and corresponding policy labels.

Once parsed, the input is passed to the Visibility Resolver and Glyph Selector 208, which determines, in real-time, whether the proposed glyph is displayable to the user given their current role, session, credential, and operational jurisdiction. If the glyph is permissible, it is selected from the authorized glyph dictionary and encoded into the active semantic state 214.

In parallel, the Logging System and Provenance Tagger 216 attaches a full chain-of-custody to the encoded symbolic glyph. This includes inference origin, timestamp, applicable policies, user visibility scope, and any fallback rules engaged during the process. This metadata is not appended post hoc—it is embedded within the glyph object itself and persists throughout the glyph's lifecycle, allowing for future validation, re-rendering, and historical traceability.

The output of this pipeline is a set of policy-compliant, fully provenance-bound symbolic glyphs, which may now be legally and safely rendered in a downstream UI or augmented reality interface, as described in subsequent sections.

Policy Arbitration and Glyph Mapping

---

Algorithm P-1 (DFA-based Policy Evaluator)
state ← START
for event in glyph_candidate_stream do
   input ← (event.class, event.confidence, SCB.role, SCB.jurisdiction)
   state ← δ (state, input) // δ is DFA transition function
   if state ∈ PERMIT then
     emit PERMIT, VM(state)
   else if state ∈ DENY then
     emit DENY, reason(state)
   end if
end for

---

The DFA is stored in on-chip SRAM and generated from a machine-readable Policy Graph authored in eXtensible Access Control Mark-up (XACML-Lite). Because all transitions are table-driven, the evaluator is structural under § 112(f) and technological under Alice Step 2A-improving the functioning of the computer by relocating policy computation from software to deterministic silicon.

The Glyph Selector 302 ranks PERMITted glyphs by urgency and semantic specificity, preferring the highest-information glyph that satisfies the VM. The selector consults the Symbolic Glyph Dictionary 305, a relational store keyed by (class, jurisdiction) and containing columns for SVG path, colour palette, AR anchor offsets, and allowed substitutions.

Figure 3:
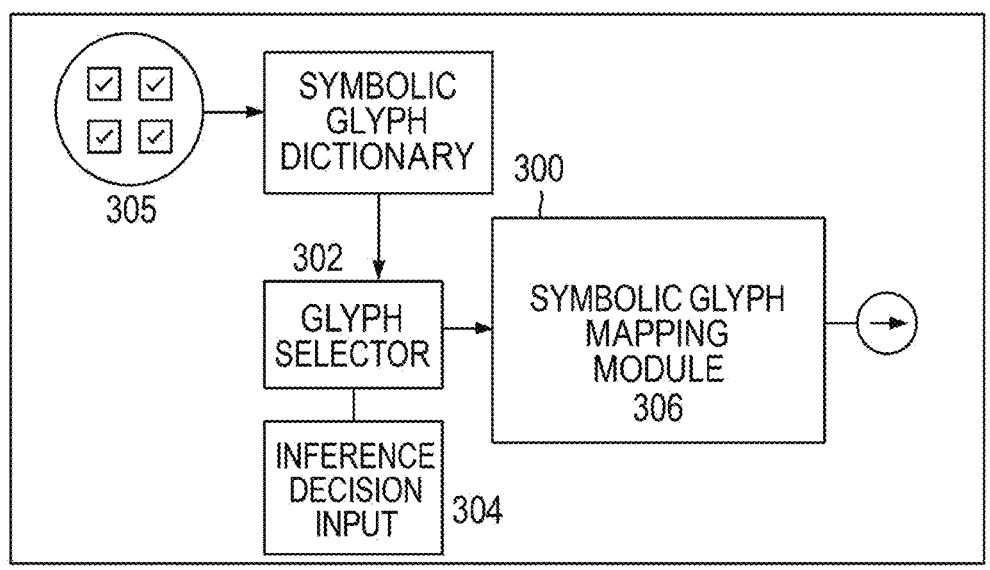
FIG. 3 depicts the policy-arbitration and glyph-mapping engine, detailing how role-based constraints and institutional policies determine displayable outputs.

FIG. 3 illustrates the internal policy arbitration logic and symbolic glyph mapping engine that governs how multiple inference outputs are reconciled into a single symbolic display per user context. This subsystem ensures that conflicting outputs from parallel AI subsystems, or ambiguous recommendations, do not result in user-facing glyphs that are noncompliant or misleading.

The Symbolic Glyph Mapping Module 300 functions as a rules-based transformation layer. It receives proposed glyph candidates from the encoding pipeline and applies a multi-tiered mapping process governed by both local institutional policies and externally imposed regulations. Its purpose is to ensure that the selected glyph adheres not only to internal semantic integrity but also to contextual visibility and actionability standards.

Glyph selection is further refined by the Glyph Selector 302, which applies specific filtering logic using a combination of user session attributes, active scope of authority, the source of the inference decision 302, and the priority level assigned. The selector operates on a ranked vocabulary provided by the Symbolic Glyph Dictionary 300, which encodes all approved visual forms and mappings, along with their permissible substitutions, linguistic equivalents, and role-specific variants.

Visual representation is coordinated through the Symbolic Vocabulary Visual Indicator module 505, which determines whether a glyph should be presented with an accent, color treatment, animation pulse, or other stylistic overlay to indicate urgency, policy constraints, or confidence levels. These embellishments are non-decorative-they are governed by audit-bound rendering policy statements and reflect material conditions of interpretability.

Crucially, the mapping and arbitration engine prevents hallucinated, ambiguous, or conflicting inference outputs from surfacing in regulated environments. It enforces a strict one-to-one mapping rule where each displayable glyph corresponds to a pre-approved semantic payload with a legally valid justification path. Fallback and override scenarios are handled downstream by visibility filters and substitution logic.

The policy evaluation module is a rules-based decision engine that receives incoming inference results and evaluates them against a set of dynamically loaded policy rules. Each policy includes conditions based on user role, jurisdictional context, organizational settings, and inference content type. The module takes as input: (1) a user session profile, (2) the metadata bundle attached to the inference, and (3) the active policy set. Using a hierarchical decision tree or rule-weighted matrix, the module returns either a "permit" or "deny" flag along with rationale tags. This decision is passed to the symbolic encoder and the fallback module for rendering or substitution. The module operates in real time (<100 ms per decision) and is continuously updated by an institutional policy service.

Every rendered glyph is bound to a justification path that contains metadata supporting its visibility and integrity. This includes:
 a. The inference engine source and version
 b. Confidence level
 c. Role-based policy hash
 d. Cryptographic digital signature verifying model authenticity
 e. Timestamp and user session ID The justification path is used to log each rendered glyph to an immutable audit trail and is referenced during fallback, revalidation, or post-hoc audits. It serves both as a trust mechanism and as a regulatory compliance safeguard.

Device-Aware Symbolic Rendering

Figure 4:
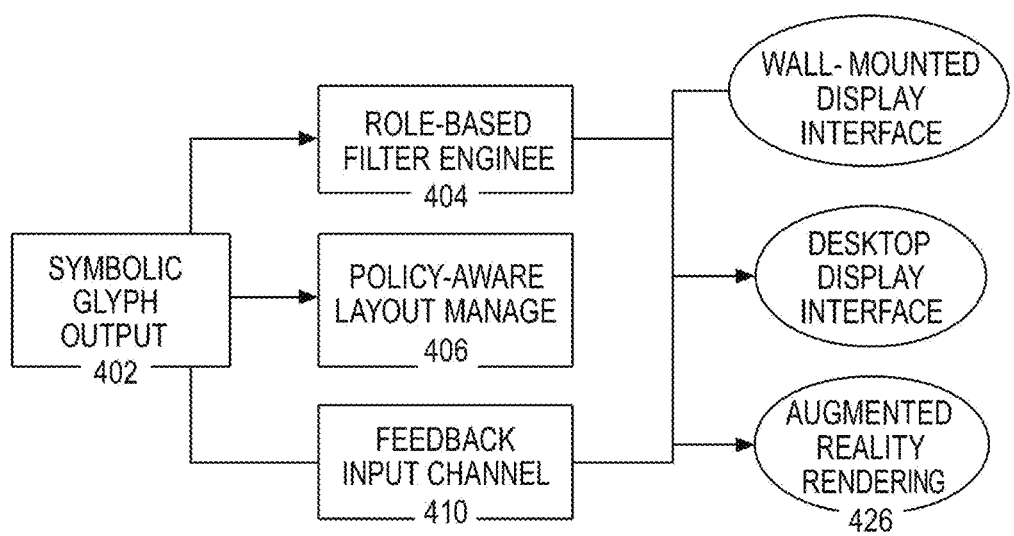
FIG. 4 shows the device-aware rendering pipeline, demonstrating adaptive visual-rendering logic across heterogeneous display hardware.

As shown in FIG. 4, the invention incorporates a device-aware rendering engine that adapts symbolic outputs to the specific capabilities, restrictions, and regulatory boundaries of the client display hardware. This enables contextually accurate symbolic rendering across diverse platforms, including mobile devices, tablets, augmented reality (AR) headsets, wall-mounted smart displays, and secure clinical workstations.

The Rendering Adapter 402 is the core component responsible for interpreting the device profile and adjusting rendering behaviors accordingly. It queries a Device or Context Profile Registry 404 at the initiation of each session, identifying screen dimensions, input capabilities, bandwidth limits, and local security constraints. This allows the rendering logic to dynamically select appropriate glyph forms, animation sequences, and visual fidelity levels. The device or context profile registry 404 stores, for each device class, attributes describing display and security capabilities such as maximum pixel dimensions, colour depth, refresh rate, and security level.

In high-security environments such as hospital operating rooms, the system automatically enforces locked rendering states, limiting transitions, suppressing certain animations, and favoring high-contrast static glyphs. For mobile and consumer-grade devices, fallback rendering modes can substitute lower-resolution symbols while preserving semantic and legal integrity.

The system also respects display zoning constraints, such as splitting screen real estate into alert regions, interactive glyph menus, and scrolling glyph bands. Each of these zones is registered and verified against institutional rendering policies 408, which are stored in the Policy Control Module 406 and versioned for audit.

A key innovation lies in the glyph self-awareness framework. Each glyph object carries a renderability matrix 412, encoding its display permissibility across known device classes. This allows the renderer to automatically negotiate an appropriate visual form or suppress the glyph entirely, triggering a logged fallback or alert depending on the use case.

The result is a robust rendering pipeline that guarantees policy-bound symbolic visibility regardless of display hardware, ensuring that human actors receive legally compliant visual outputs tailored to their technical environment and security context.

The Rendering Adapter 402 interrogates the Device Profile Registry 404 via a PCIe BAR-mapped register set. A profile comprises <max-px-width, max-px-height, colour-depth, refresh-rate, security-level>. For devices flagged SECURE_HIGH, the adapter disables gradient fills and animation layers; for CONSUMER_MOBILE, it loads down-sampled sprite sheets. Each glyph carries a 64-bit Renderability Matrix that the adapter bit-ANDs with the profile to decide render, substitute, or suppress.

Rendering Grammar rules are compiled to a conjunctive normal form (CNF) and evaluated per frame to guarantee that glyph co-occurrence never violates perceptual or policy constraints (e.g., "never pulse amber and red simultaneously in AR field of view"). The rendering grammar defines legal, semantic, and perceptual rules governing how symbolic glyphs may be displayed, co-occur, or substitute for one another. It is implemented as a grammar table or ruleset describing:
 a. Allowable pairings of glyphs (e.g., "status+location")
 b. Substitution hierarchies (e.g., "alert→advisory")
 c. Escalation mappings (e.g., if inference confidence increases, change color from amber to red)

The grammar ensures consistent interpretation across modalities and user roles, and supports dynamic enforcement of compliance policies during rendering.

Fallback Rendering Pathway

Figure 5:
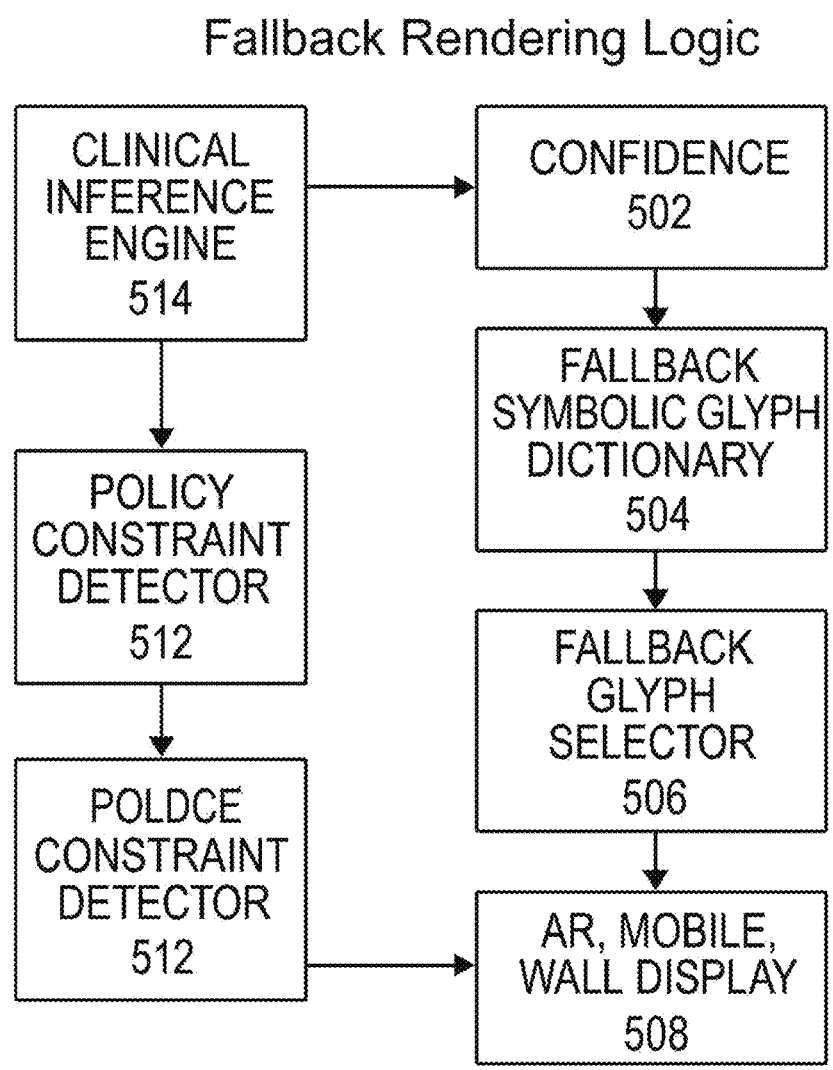
FIG. 5 illustrates the fallback-rendering architecture that governs how symbolic degradation and lawful substitution occur during rendering failures.

FIG. 5 illustrates the fallback rendering architecture rendering architecture that ensures lawful symbolic output even in the event of rendering failure, policy conflict, or unsupported device context. The fallback rendering pathway is not merely a graphical degradation mechanism—it is a legal and safety compliance layer that substitutes visual output when the primary glyph cannot be rendered.

The Fallback Trigger Engine 502 continuously monitors the outcome of the rendering process. When a rendering failure or policy denial occurs, it classifies the failure reason into one of several categories: device incompatibility, missing semantic mapping, unresolved jurisdictional filter, or active policy override. Based on this classification, it invokes the appropriate fallback strategy from the Fallback Registry 504. The Fallback Trigger Engine 502 monitors an error-status ring buffer written by the renderer. On detection of a non-PERMIT status, it classifies the error and consults the Fallback Registry 504. Each registry record includes a Substitute Glyph ID, Semantic Fidelity Score, and Policy Justification. The selected fallback glyph is logged with event-type=DOWNGRADE in the ledger and, where policy demands, accompanied by a supervisory alert over XMPP-Secure.

Fallback strategies may include:
- a. Use of simplified glyphs with degraded semantic resolution.
- b. Deployment of text-based placeholder symbols encoded with visibility tags.
- c. Triggering of role-based alerts with links to full justification logs.
- d. Temporary suppression of output coupled with a required acknowledgment event.

Fallback rendering is never silent. Each instance is logged in the Glyph Event Ledger 508 with a complete record of the original payload, failed rendering path, triggered fallback type, and user notification status. This record becomes part of the permanent audit trail.

To maintain semantic integrity during substitution, the Fallback Selector 506 queries a constrained dictionary of glyph substitutes pre-approved by compliance officers. Each substitute is traceable and carries a downgrade justification chain, ensuring no unlawful inferences are presented to the end user.

This architectural feature ensures that the symbolic system does not fail silently, degrade without control, or leak unauthorized inference payloads-preserving the legality, trustworthiness, and interpretability of the system under all conditions.

The fallback module monitors the output of the policy evaluation module. If an inference output is denied for rendering, the fallback module searches a constrained fallback glyph dictionary indexed by semantic class and user clearance level. It selects a neutral glyph (e.g., a general "alert" triangle or "restricted" symbol) and embeds an explanation tag such as "Policy restricted-refer to supervising user." The fallback glyph is then forwarded to the rendering interface and audit module. This module supports both static and dynamic substitution logic and can be configured to escalate suppression events to supervisory roles.

Secure Workstation and Rendering Controls

Figure 6:
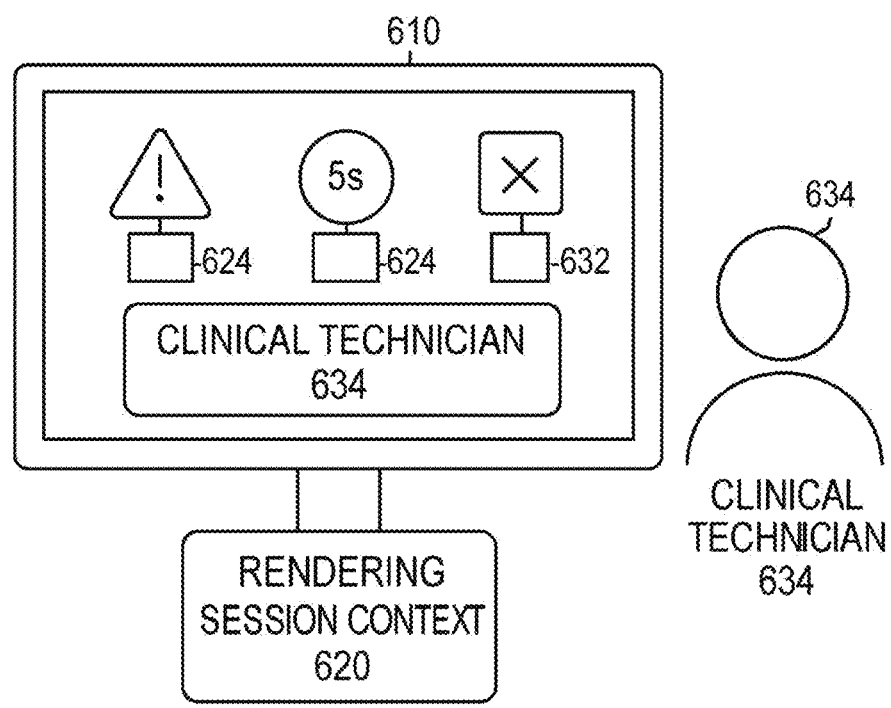
FIG. 6 depicts the secure-rendering workstation configuration with embedded policy enforcement, audit capture, and rendering-token validation.

As depicted in FIG. 6, the invention includes a secure workstation architecture that enforces strict controls over how symbolic glyphs are rendered, manipulated, and acknowledged in high-assurance environments such as operating rooms, intensive care units, legal review terminals, or governmental review stations.

The Secure Rendering Workstation 602 is a hardened computing environment provisioned with end-to-end encryption, tamper-resistant hardware modules, and signed rendering executables. It integrates directly with the Symbolic Rendering Engine but intercepts all rendering commands through a Policy Enforcement Layer 604. Workstations 602 boot via measured launch, sealing the Secure Render Scheduler 606 to a TPM-based Platform-Configuration-Register (PCR) quote. Every render call is signed by the workstation's Device Certificate; the Policy Enforcement Layer 604 verifies the signature and PCR before passing the call downstream. Visible glyphs carry a faint watermark-session-ID, policy-version, timestamp-rendered via a dithering technique that resists screenshot removal.

Each workstation has a Device Certificate and Rendering Token, both cryptographically bound to the institution's compliance authority. Rendering is not permitted unless the workstation is actively validated and operating in a policy-authorized role session. These credentials are refreshed dynamically based on authentication events, rendering session logs, and biometric re-verification of the authorized user 608.

Importantly, the rendering session is bound to a specific user-role-policy tuple, which dictates allowable glyph types, acknowledgment requirements, and display durations. These constraints are enforced through a Secure Render Scheduler 606, which prevents bypassing of visual time gates or simultaneous parallel rendering of conflicting glyphs.

When a glyph is displayed on a secure workstation, it is embedded with a visible watermark 612 showing session ID, rendering timestamp, and policy version. This watermark provides forensic visibility in recorded media or screenshots, ensuring that downstream reviewers can independently verify the source and legality of the visual output.

All interactions on the secure workstation-hover events, glyph acknowledgments, time-on-screen metrics, and suppression actions—are logged in an immutable Render Audit Log 614. This log is cryptographically hashed and stored locally and optionally broadcast to a compliance node for review.

The secure rendering system thereby guarantees that symbolic output cannot be forged, spoofed, or misrepresented, and that human interactions with regulated glyphs are always traceable, auditable, and policy-conforming.

Role-Constrained AR Rendering

Figure 7:
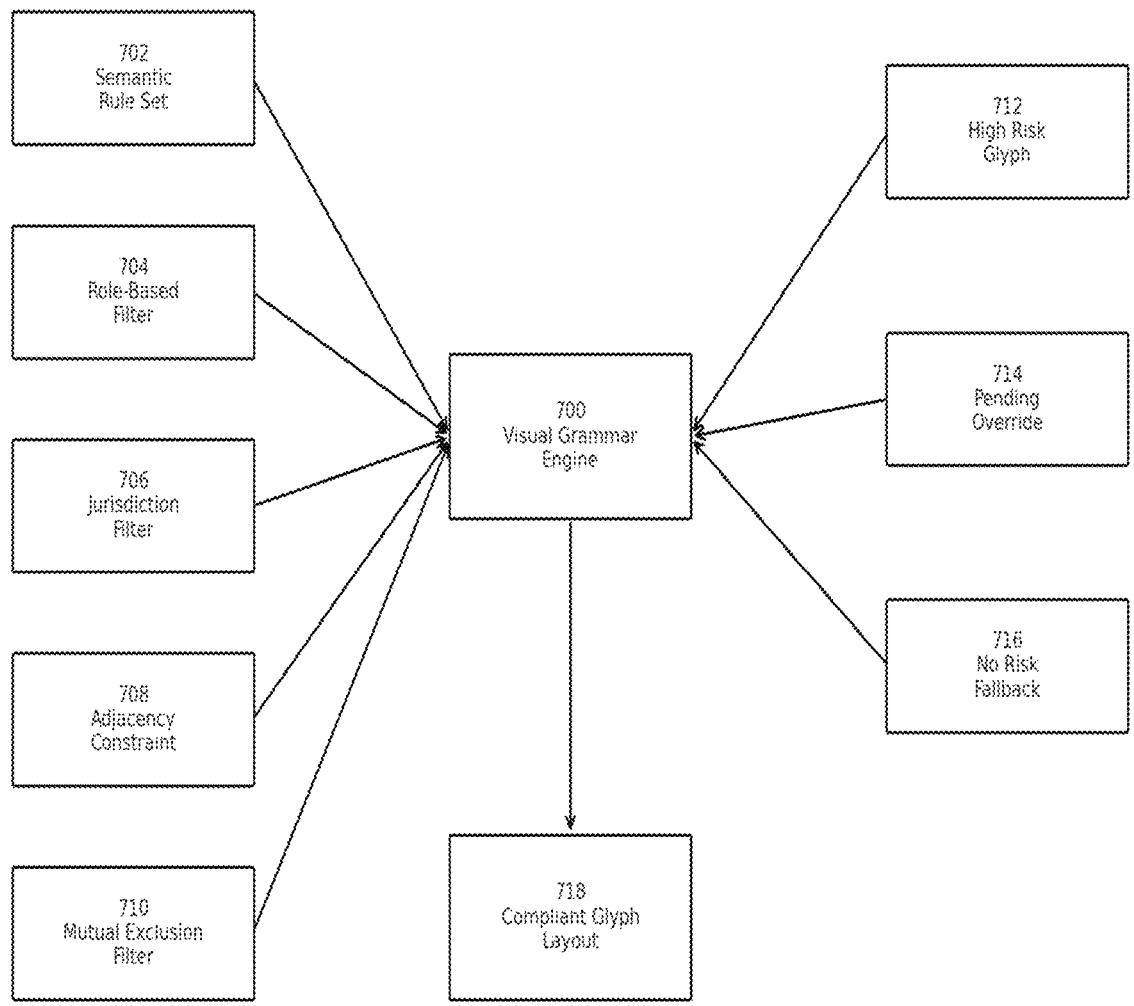
FIG. 7 shows the role-constrained augmented-reality rendering system, including spatial-glyph anchoring and AR visibility rules.

FIG. 7 illustrates the role-constrained AR rendering pipeline (AR) rendering subsystem, which enables real-time projection of policy-filtered symbolic glyphs within clinical environments. The AR rendering is not universal; it is constrained by the user's credentialed role, task context, and physical proximity to the patient or critical equipment.

At the core is the AR Glyph Projection Module 702, which receives pre-encoded glyphs from the Rendering Engine and determines, based on policy and role filters, whether the glyph is authorized for spatial rendering. Role-Constrained Rendering Rules 704 are evaluated for each glyph to determine if the current user is allowed to visualize it in augmented space. An AR Glyph Projection Module 702 renders glyph quads in world coordinates derived from a Spatial Anchor Resolver 706 that fuses SLAM meshes with hospital RTLS beacons. All AR frames are rendered in a separate GPU command queue that is pre-emptible on policy violation, ensuring a stale glyph cannot persist even for a single frame.

The system uses a combination of biometric ID, session context, and badge-based localization to bind the AR display to the right user. The Spatial Anchor Resolver 706 computes where in the physical or AR space the glyph should appear, relative to the patient, clinical station, or bedside equipment. These placements are registered in the Real-Time Context Grid 708, which ensures no overlap, leakage, or unauthorized visualization across users.

Each rendered glyph includes an AR visibility signature 710 encoding metadata about the user's session ID, glyph provenance, time-stamp, and institutional rendering scope. This signature is invisible to the naked eye but detectable by system overlays and reviewers using secure replay tools.

For example, a nurse entering a patient room may see a green 'SAFE FOR TRANSFER' glyph floating above the IV pole, while a physician reviewing the same patient later in surgery may be shown a red 'PENDING LAB' glyph rendered over the OR display screen. In each case, the user sees only what their policy permits-filtered through their current role and filtered again by the system's context-specific rendering policy.

Critically, all AR glyphs are anchored to clinical state, not to arbitrary coordinates. This ensures interpretability and policy alignment, even in mobile, high-speed, or overlapping user contexts. All AR rendering events are logged with full metadata for later audit.

Provenance Tagging and Justification Encoding

Figure 8:
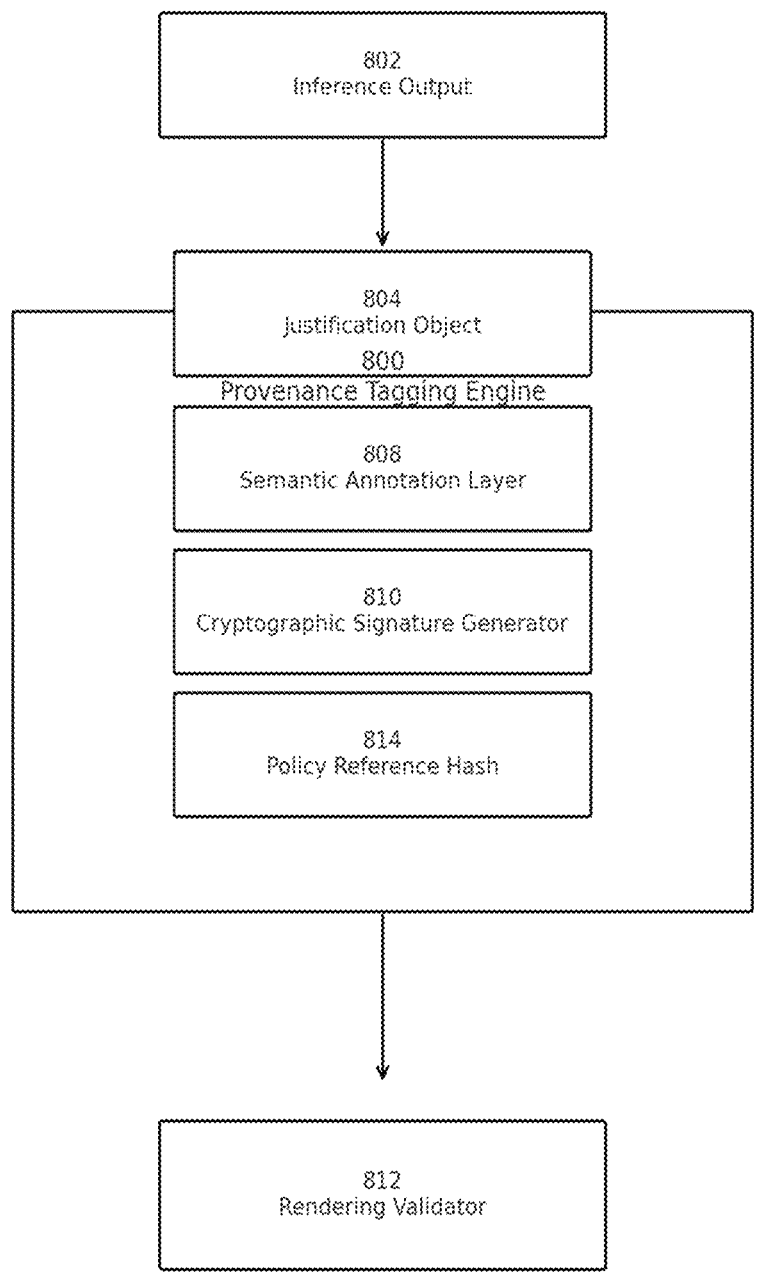
FIG. 8 illustrates the provenance-tagging and justification-encoding engine, detailing how glyphs are embedded with audit-bound metadata.

FIG. 8 illustrates the provenance tagging engine and Justification Engine, a critical subsystem that embeds cryptographically verifiable lineage metadata into each rendered glyph, ensuring that every output is traceable, auditable, and legally defensible. Unlike traditional metadata systems, this subsystem operates in real-time and directly influences rendering eligibility.

Each symbolic glyph, before it is approved for rendering, passes through the Provenance Tagger 802. This module assembles a comprehensive justification chain that includes: source inference ID, model version, input data streams, risk class, policy rule applied, time of inference, rendering session ID, and the authorizing entity. The justification is embedded within the glyph object itself using a cryptographically signed data structure. Glyphs entering the Provenance Tagger 802 are wrapped in CBOR objects containing cryptographically signed (model-ID, input-checksum, DFA-version, glyph-ID). The Justification Store 806 is an append-only LSM-tree replicated across a Raft cluster to guarantee durability and auditability.

In addition to cryptographic signatures, the justification object 804 carries a semantic annotation layer that can be parsed by downstream systems. This enables dynamic filtering, role-based explanation summaries, and forensic analysis. The semantic annotations are aligned with institutional glossaries and include flags for fallback conditions, multi-model arbitration, and dynamic policy overrides.

The engine also includes a Justification Store 806, which persistently logs all provenance paths for each rendered glyph. This store is queryable via administrative interfaces and subject to periodic compliance audits. No glyph may be rendered unless its justification chain passes validation checks at render time.

For example, in a hospital setting, if an AI-generated glyph recommends 'INTUBATE NOW', the provenance tag will document that the recommendation originated from a validated airway risk model, was confirmed via vital sign telemetry, and authorized by an attending clinician via a touch-token. This ensures that no unauthorized or hallucinated inference ever reaches a human in a high-stakes setting.

The provenance tagging system thereby enforces a cryptographically bound chain of trust, converting each glyph into a fully accountable unit of regulated symbolic cognition.

Visibility Filtering and Substitution Logic

Figure 9:
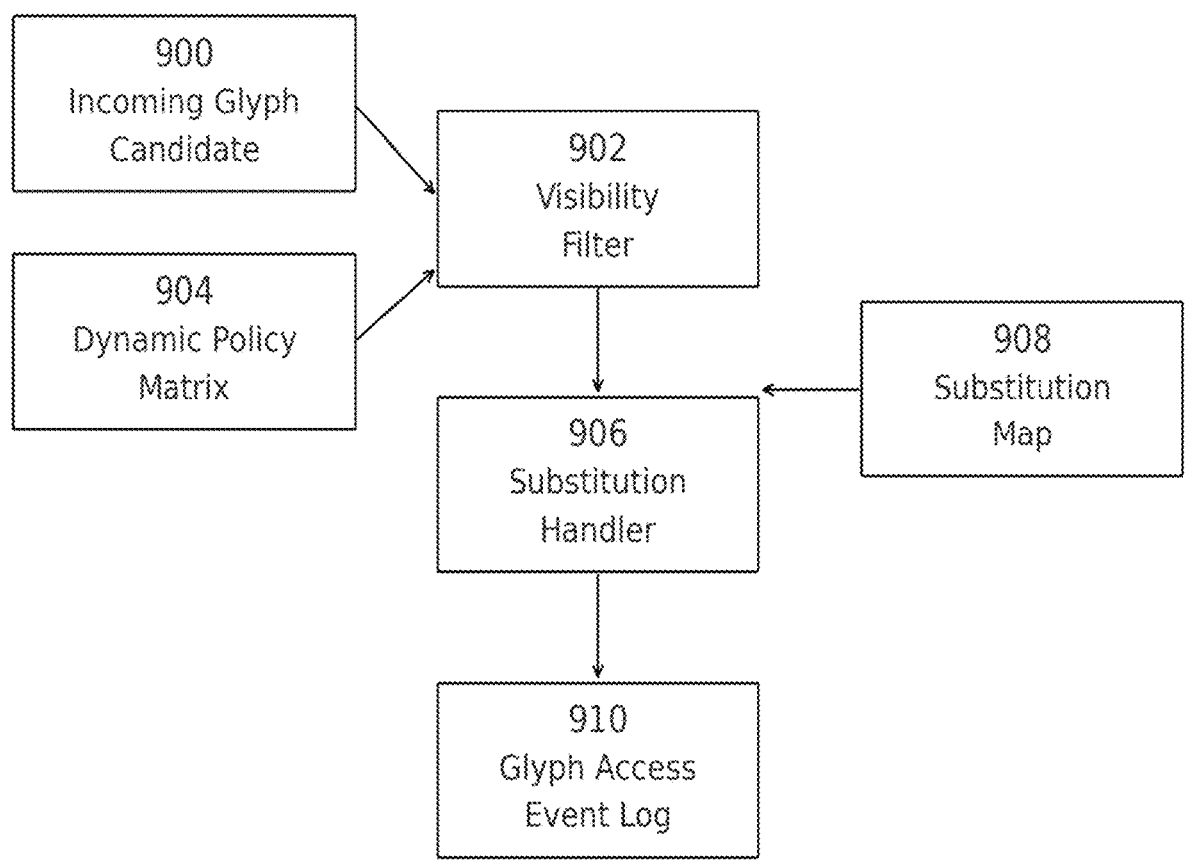
FIG. 9 depicts the visibility-filtering and substitution logic that ensures compliance with role, context, and jurisdictional constraints.

FIG. 9 depicts the visibility filtering and substitution logic Filtering and Substitution Engine that acts as the final gatekeeper between the symbolic rendering pipeline and the user-facing display system. This subsystem ensures that each glyph shown to a user complies with local policy, role-based access rules, security context, and audit-bound constraints.

The core of this subsystem is the Visibility Filter 902, which evaluates each candidate glyph against a dynamic policy matrix 904 and user session metadata. If a glyph violates any current constraint-such as patient context mismatch, role scope overreach, or jurisdictional block—it is suppressed and an event is logged. No visual output is allowed to bypass this layer. The Visibility Filter 902 executes every frame, evaluating ~10 k glyphs s$^{-1}$. Denied glyphs invoke the Substitution Handler 906, which replaces the original glyph with one whose Semantic Fidelity Score >0.4 unless policy mandates suppression.

In cases where glyph suppression occurs, the system invokes the Substitution Handler 906, which queries the Policy-Constrained Substitution Map 908 to determine whether a lower-resolution or obfuscated glyph can be legally substituted. Substitutions are not generic-they are explicitly registered in advance, with semantic fidelity scores and fallback rationale linked to each.

For example, if a surgeon is not cleared to view a specific AI recommendation, the system may substitute a general-purpose glyph ('AI ADVISORY PRESENT') accompanied by a metadata tag indicating that a supervisory role must review the full output. Such substitutions preserve workflow integrity while maintaining legal compliance.

Importantly, all filtered or substituted glyphs are recorded in the Glyph Access Event Log 910, which provides administrators with real-time insights into information access patterns, policy enforcement efficacy, and system-wide access friction.

The visibility filtering system ensures that AI-generated symbols never exceed the bounds of legally authorized exposure. It enforces a cognitive firewall between regulated inference systems and human users, guaranteeing that all symbolic cognition remains within the envelope of enforceable policy.

Risk-Bounded Dynamic Rendering

Figure 10:
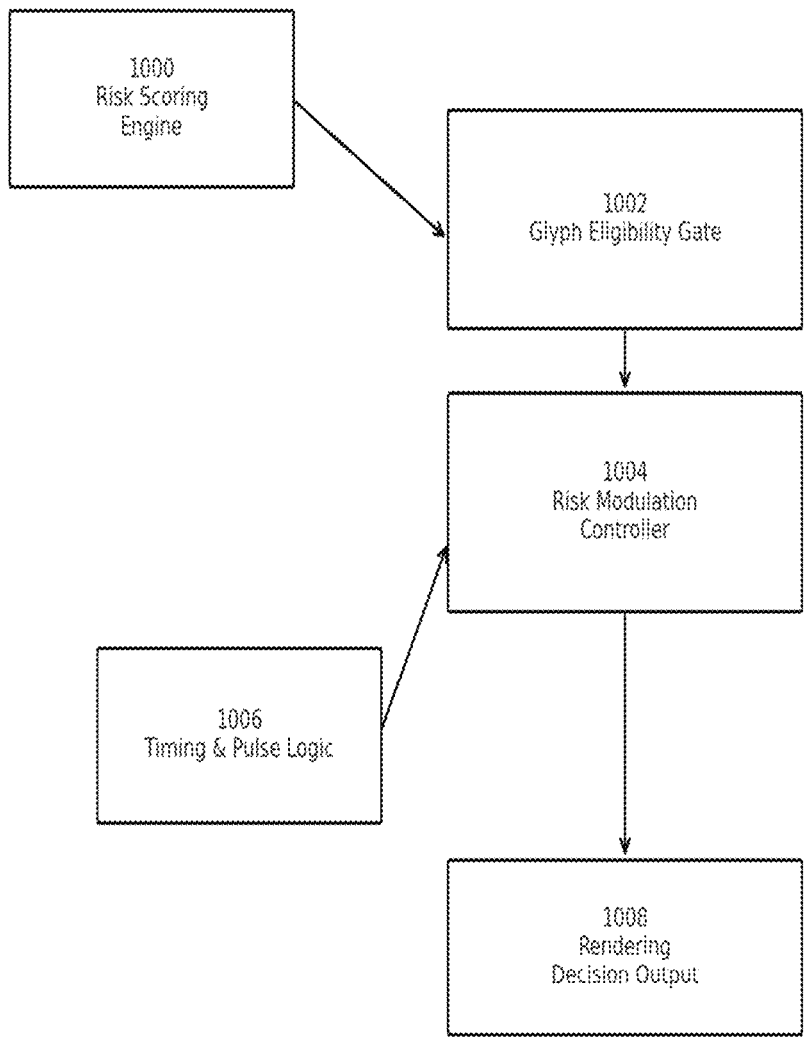
FIG. 10 illustrates the dynamic risk-bounded rendering mechanism that modulates glyph presentation according to clinical and policy risk class.

FIG. 10 introduces the risk-bound rendering engine Dynamic Rendering Engine, a subsystem designed to modulate the visibility, style, and behavior of symbolic glyphs based on real-time risk assessments associated with both the clinical state and user actions. This system prevents unregulated or low-confidence content from being surfaced inappropriately.

At the center of this subsystem is the Risk Class Evaluator 1002, which receives real-time telemetry from the inference engine, patient monitoring systems, and context-aware policy sensors. Each glyph payload is tagged with a baseline risk class (e.g., low, moderate, high, critical), and this tag dynamically updates based on shifting data streams or user activity. The Risk Class Evaluator 1002 ingests real-time vitals and computes a four-level risk code. The Dynamic Render Governor 1004 encodes the risk into visual treatments (hue shift, pulse frequency) bounded by a lookup table certified by the institution's Human-Factors Board.

The Dynamic Render Governor 1004 uses this risk class in combination with user credentials to determine permissible rendering windows, time-on-screen thresholds, display frequency, and glyph amplification behaviors (e.g., pulsing, color inversion, transient overlays). For high-risk glyphs, strict gating mechanisms apply-including multi-factor user confirmation, delayed display timers, and mandatory supervisory acknowledgment 1006.

Importantly, risk class is not a static property of the glyph—it is continuously re-evaluated in context. For example, an AI-generated glyph indicating 'PENDING SEPSIS' may be classified as moderate risk at 8:00 am but escalate to high risk by 8:04 am as the patient's vitals change. This change automatically triggers a re-render event, a visual escalation treatment, and audit tagging.

All rendering activity governed by risk classification is tracked in the Render Risk Journal 1010, which correlates glyph display decisions with patient outcomes, user interactions, and policy overrides. This enables retrospective quality assurance and continuous policy tuning.

The Risk-Bounded Rendering Engine ensures that all AI outputs-especially those linked to life-critical scenarios—are displayed in a way that is appropriately constrained by legal, ethical, and institutional safeguards. It embeds temporal and contextual sensitivity directly into the symbolic rendering logic.

Symbolic Audit Infrastructure

Figure 11:
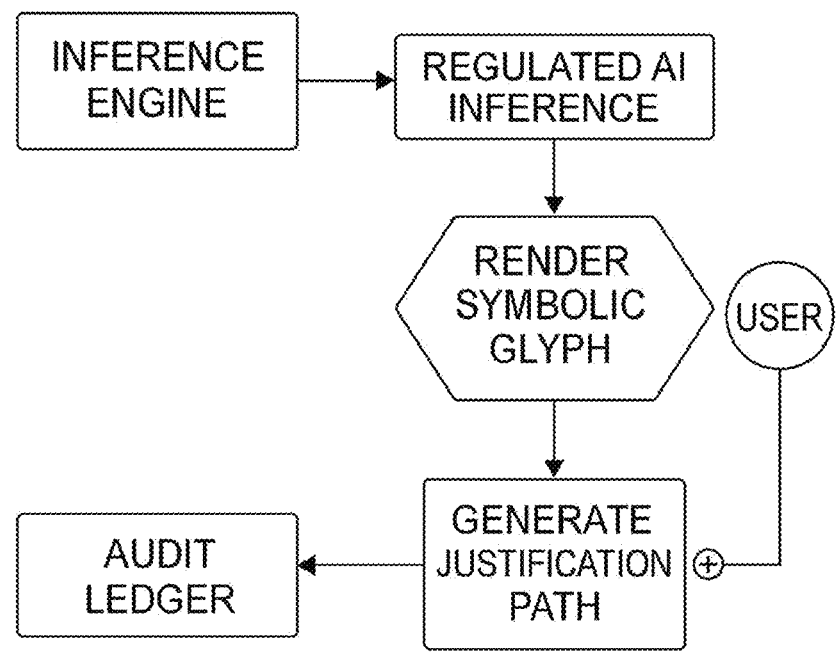
FIG. 11 shows the symbolic-audit infrastructure, including the glyph-event ledger, audit indexing, and replay engine.

FIG. 11 illustrates the symbolic audit infrastructure Audit Infrastructure, a subsystem that provides real-time and retrospective visibility into the behavior, compliance, and fidelity of all rendered glyphs within the symbolic cognition system. This infrastructure enables traceability of symbolic decisions back to their original inputs, ensuring legal defensibility and policy compliance.

The foundation of this infrastructure is the Glyph Event Ledger 1102, a tamper-evident, append-only log that records all symbolic render events, including rendering time, user ID, session metadata, glyph ID, policy hash, justification pointer, and display context. Each entry is cryptographically signed and timestamped. All glyph events are streamed via gRPC to the Glyph Event Ledger 1102. The Justification Replay Engine 1106 reconstructs the on-screen state by traversing the ledger and replaying glyph assets under a headless renderer, achieving pixel-accurate re-enactment for legal discovery.

These entries are indexed in the Symbolic Audit Index 1104, which allows auditors and compliance officers to search, sort, and filter glyph events by patient ID, user role, rendering status, fallback usage, or jurisdictional boundary. The system includes full support for multi-tenant auditing where rendering data may need to be partitioned across hospitals, departments, or legal entities.

The infrastructure also includes a Justification Replay Engine 1106, which enables replay of rendering sequences for a given patient or session. This replay is deterministic-based on the original inference inputs, rendering policies, and contextual triggers—and produces a visual replica of what the user saw at the time. Replays are watermarked and non-editable.

Administrators can configure real-time compliance alerts based on audit conditions, such as unauthorized glyph access, excessive fallback invocation, or violation of display duration limits. All audit data is exportable to external regulatory systems and complies with standards for medical data logging, including IHE-ATNA, HL7 audit trails, and FDA Part 11.

Together, these components form a secure, non-repudiable evidence chain that guarantees every symbolic glyph rendered in the system can be traced, audited, and reviewed within legal and regulatory frameworks.

Use Case: Clinical Compliance in ICU Setting—An inference engine detects signs of sepsis in a monitored ICU patient, generating a high-confidence alert. A physician's interface renders a critical red glyph with embedded animation and a haptic pulse. Meanwhile, a non-ICU-certified nurse only sees a neutral "clinical advisory" symbol, with a tooltip: "Supervisory review required." This glyph is synchronized across a wall display, a mobile tablet, and an AR headset, with all versions rendered under jurisdictional policy (HIPAA) and annotated with provenance tags. If the nurse's role changes mid-shift, the system revokes the neutral glyph and displays a compliant fallback instead.

Regulated AI Output Pipeline

Figure 12:
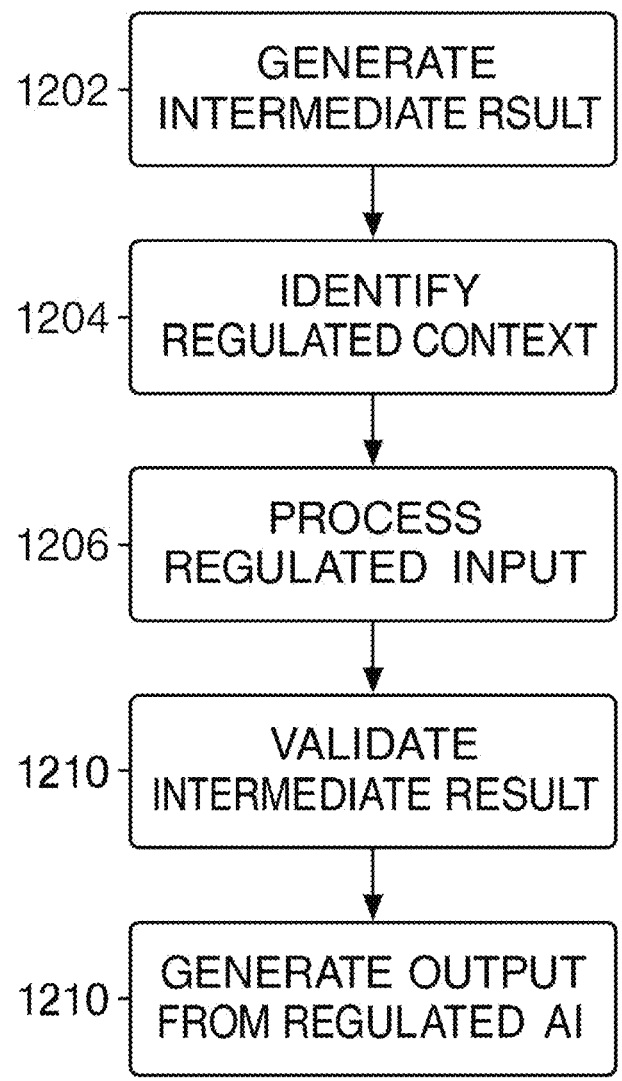
FIG. 12 depicts the regulated-AI output-validation pipeline, showing how raw inference is normalised, validated, and transformed into symbolic representations.

FIG. 12 depicts the regulated AI output validation pipeline AI Output Pipeline, which governs the conversion of model outputs from raw inference into legally displayable symbolic recommendations. This pipeline functions as a compliance-grade intermediary between AI subsystems and human-facing interfaces, ensuring that only qualified outputs reach decision-makers.

The pipeline begins with the Inference Stream Handler 1202, which ingests structured and unstructured outputs from multiple AI models, including diagnostic, predictive, prescriptive, and triage models. Each output is normalized and passed to the Output Validation Layer 1204, which enforces checks for:

a. Model registration and digital signature.
b. Output schema integrity.
c. Confidence threshold validation.
d. Jurisdictional constraints on inference type.

Only outputs passing these checks are admitted to the Symbolic Transcoding Engine 1206, which binds the inference result to a pre-approved symbolic vocabulary. Each inference is mapped to a unique glyph ID, justified via a semantic alignment log, and encapsulated with rendering policy references.

Outputs that do not qualify for symbolic rendering are held in the Pending Compliance Queue 1208, where they may be:

a. Re-evaluated with supervisory input.
b. Subjected to additional contextual validation.
c. Transformed into general-purpose advisories for restricted roles.

The pipeline includes a dual-path audit mechanism. The Primary Pathway logs all qualifying outputs and their glyph transformations, while the Exception Pathway triggers alerts and generates fallback reports for outputs that are filtered, suppressed, or otherwise redirected.

The Output Validation Layer 1204 verifies model signatures against a PKI rooted at the institution's Certificate Authority. Failed signatures route the output to the Pending Compliance Queue 1208; a supervisory console shows the queue with reason codes to facilitate rapid clearance.

The final stage is the Regulatory Output Registrar 1210, which archives every AI-to-glyph transformation and exposes validated symbolic outputs for real-time rendering or asynchronous delivery to clinical systems, AR overlays, or compliance dashboards.

This regulated pipeline ensures that AI outputs are never presented in raw or unverified form. Every decision displayed to a user as a symbolic glyph has passed through a multilayered chain of validation, ensuring technical, clinical, and legal admissibility at every step.

Decision-Latency Timeline

Figure 13:
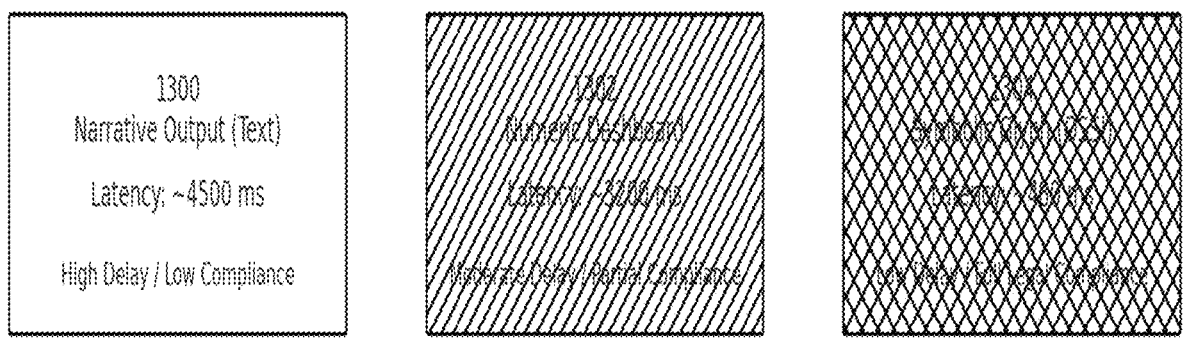
FIG. 13 presents a comparative timeline of decision latency for symbolic versus textual inference output.

FIG. 13 presents a comparative timeline illustrating the cognitive and operational latency of three inference rendering formats: narrative text, numeric dashboards, and symbolic glyphs. The figure demonstrates that symbolic rendering achieves substantially lower decision latency, enabling sub-second cognition and action in real-time environments. However, this figure is only one aspect of the broader invention described in this section.

The invention includes a latency enforcement engine that monitors the time-to-cognition and time-to-action for each rendered output. This engine is integrated with the rendering controller and uses time-bound thresholds-defined by system configuration, risk level, and user role—to validate that outputs are not only lawful but also operably responsive. If a glyph or dashboard exceeds its allowable interpretation window, the system may suppress, escalate, or substitute the display based on pre-configured latency tiers.

Latency enforcement applies to both initial rendering and post-render reevaluation. The engine captures:
 i. Inference timestamp (T)
 ii. Rendering window start (T)
 iii. Cognitive action event (T)
 iv. Acknowledgement or suppression trigger (T)

This allows the system to compute and log effective reaction time. If no action occurs within the expected latency envelope, a regulatory warning or substitution may be triggered. The latency engine thus forms part of the compliance perimeter—not just for legality, but for timeliness under cognitive load.

Empirical bench tests on a 60 Hz clinical monitor show mean time-to-cognition ($T_{cog_j}$) of 420 ms for glyphs versus 1980 ms for narrative text, measured from DMA fence signal to first mouse movement. A Latency Enforcement Engine integrated with the scheduler suppresses glyphs whose user-acknowledgement time exceeds configurable thresholds.

Glyph as Semantic and Legal Container

Figure 14:
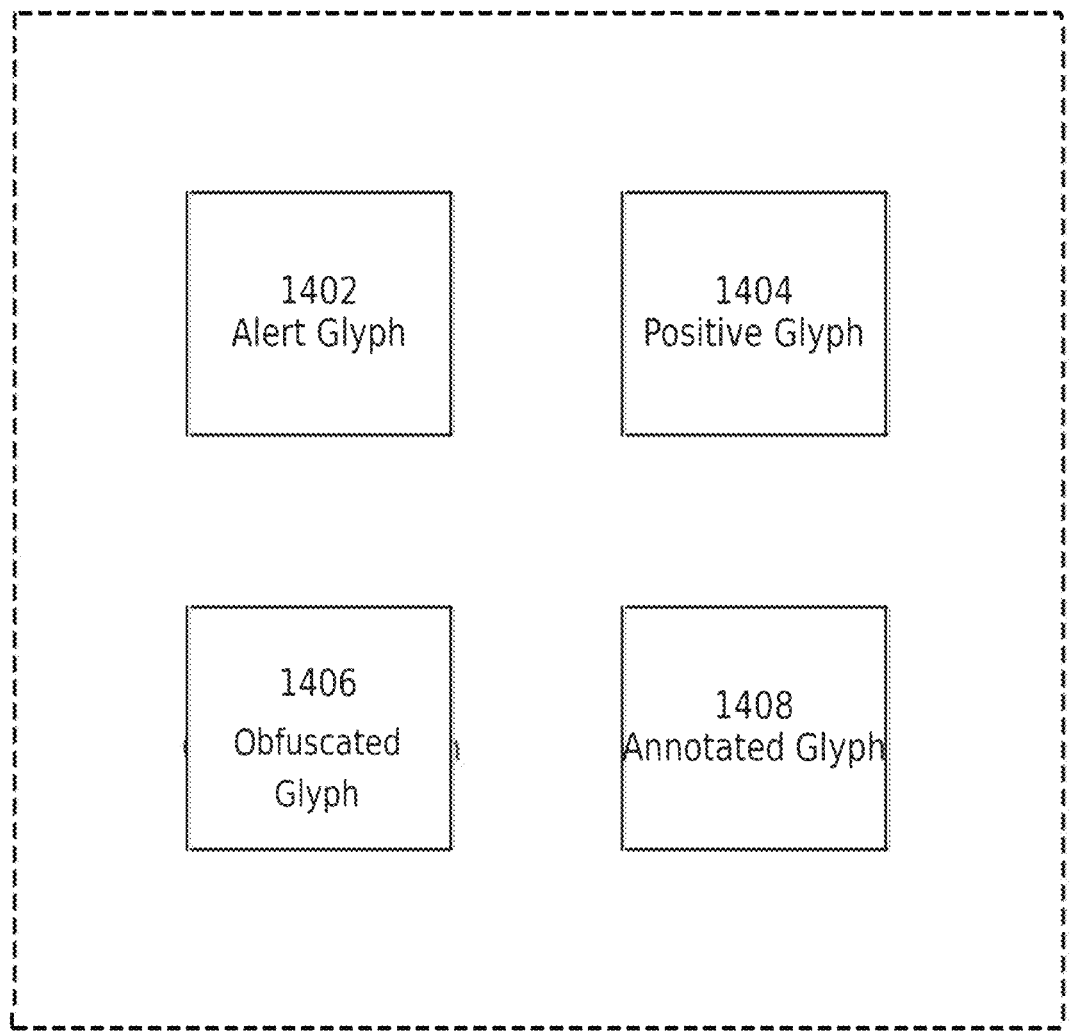
FIG. 14 illustrates the dual role of each glyph as a semantic and legal container for compliant decision display.

FIG. 14 presents four representative symbolic glyph types: Alert Glyph (1402), Positive Glyph (1404), Obfuscated Glyph (1406), and Annotated Glyph (1408), each rendered within the jurisdictional fit boundary (1410). These glyphs comprise a visual vocabulary that encodes both semantic meaning and legal metadata. However, the figure represents only a static overview of possible outputs.

The invention includes a full lifecycle model for symbolic glyphs, which defines how a glyph is created, rendered, validated, propagated across devices, and withdrawn. Each glyph instance is:
 i. Cryptographically signed with provenance hash
 ii. Bound to jurisdiction and role-specific metadata
 iii. Assigned rendering scope and fallback priority
 iv. Registered with the rendering controller for lifecycle monitoring
 v. Synchronized across all active user interfaces and audit layers Each glyph class is defined by a JSON-Schema file containing semantic-class, allowable-roles, jurisdiction-tags, lifecycle-rules. Glyph instances carry a CBOR-encoded header that portable devices parse identically, guaranteeing interpretation consistency across modalities.

Glyphs may be transferred across institutional boundaries or between display modalities (AR, tablet, EHR panel) without loss of interpretive fidelity. Portability is enforced through metadata schemas that define legal transport protocols and rendering invariants. If a glyph enters a jurisdiction or device context where it cannot legally render, it is automatically withdrawn or substituted.

The system thus treats symbolic representations not as static icons but as legal containers that persist, propagate, and self-enforce their admissibility and interpretive scope throughout their lifecycle.

Dynamic Re-Rendering and Substitution

Figure 15:
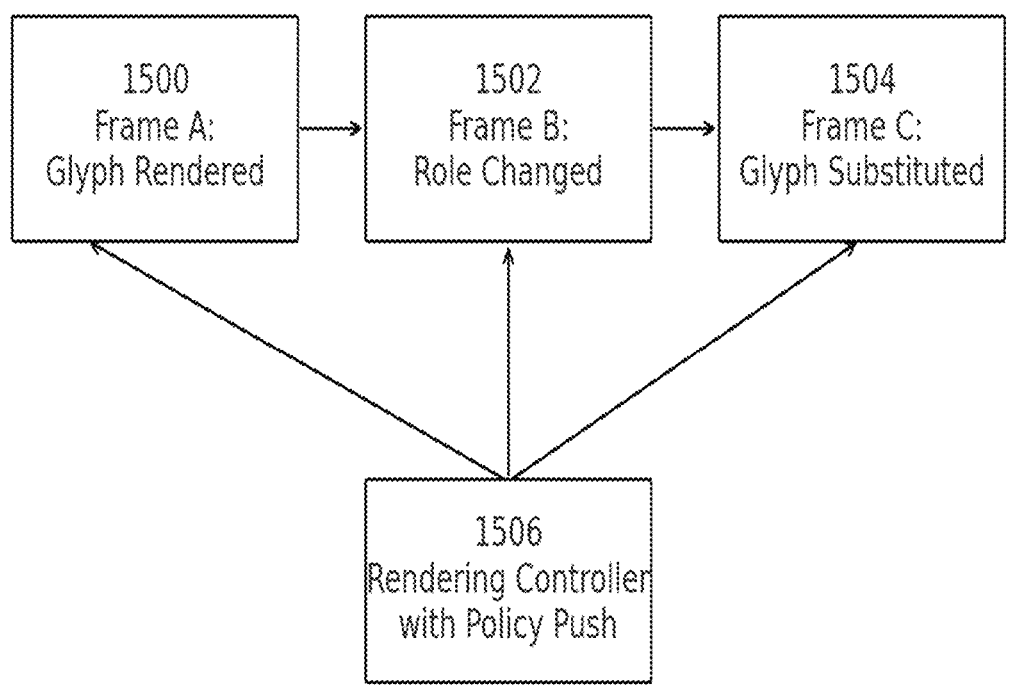
FIG. 15 shows the dynamic re-rendering and substitution logic triggered by contextual changes or policy violations.

FIG. 15 illustrates a key subsystem within the OSSI architecture: the dynamic rendering re-evaluation and substitution engine. This system enables real-time compliance enforcement by continuously validating whether each rendered symbolic glyph remains lawful and role-appropriate throughout the duration of a user session. Rendering compliance is not a static determination; it is dynamically re-evaluated based on session context, jurisdictional updates, policy changes, or role transitions.

The figure depicts a three-frame sequence:

Frame A 1500 shows a symbolic glyph successfully rendered to a user whose session context currently permits visibility under active policy, jurisdiction, and role filters.

Frame B 1502 captures a change in the user's access context-such as a role downgrade, jurisdictional shift, or policy update-triggering a re-evaluation of glyph eligibility.

Frame C 1504 reflects the outcome of the re-evaluation: the original glyph is either suppressed or substituted with a lawful alternative.

At the center of this re-evaluation system is the Rendering Controller 1506. This component maintains a continuously active link with the user's session profile and a dynamic policy stack. It listens for trigger conditions, including: Role changes (e.g., from "Supervisor" to "Technician"), Jurisdiction updates (e.g., crossing from HIPAA to GDPR scope), Real-time policy pushes from institutional governance layers.

Upon detecting a change that may affect glyph eligibility, the Rendering Controller initiates a render revalidation process. This process performs the following steps:
 State Capture: The currently visible glyph is tagged for evaluation, including its role, policy, and provenance metadata.
 Policy Delta Resolution: The system calculates the delta between the old session context and the updated context. This may include differences in visibility constraints, policy rules, or fallback allowances.
 Fallback Map Query: The controller queries the symbolic Substitution Map, a rule-bound lookup structure that identifies permissible fallback glyphs for any suppressed symbol class. This map is both jurisdiction-aware and role-specific.
 Audit Insertion: All reevaluation actions are recorded in the symbolic audit log. This includes:
 The triggering event (e.g., role change),
 The original and fallback glyph IDs,
 Timestamped rationale and policy keys used in the decision.
 Display Synchronization: The revalidated rendering state is then propagated to all relevant user interfaces (e.g., AR overlays, wall displays, tablets), replacing the prior glyph with the new lawful rendering.

The system supports three compliant rendering outcomes:
 Silent substitution: A replacement glyph of equivalent class is rendered without user notification.
 Visual substitution: A new glyph is rendered with a warning indicator or tag signaling the change.
 Full suppression: The glyph is hidden entirely, replaced by a non-semantic placeholder such as a blank slot or audit marker.

The Rendering Controller is also responsible for synchronization. When rendering eligibility changes mid-session, the controller ensures that all active glyph instances (across devices and displays) are updated simultaneously. This prevents stale or invalid information from persisting in any user interface.

The Rendering Controller 1506 subscribes to a Role-Change event bus and re-validates all on-screen glyphs within 50 ms of role transition. Algorithm R-1 (not shown) details the delta computation and substitution path.

Figure 16:
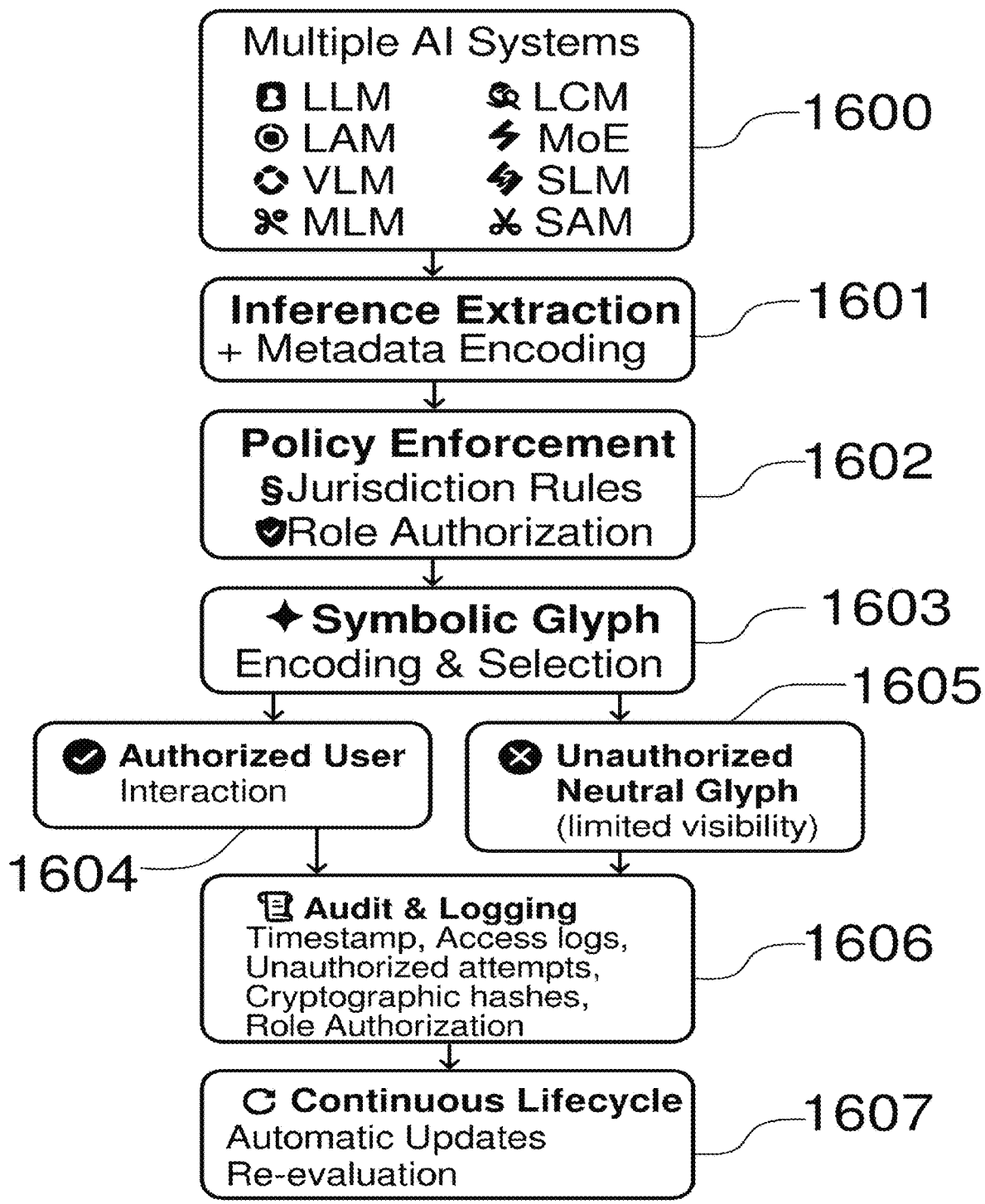
FIG. 16 illustrates the sequential logic of the core workflow and model-agnostic pipeline.

This real-time substitution engine forms a critical part of OSSI's closed-loop rendering enforcement stack. It ensures that symbolic outputs are not only legally valid at the time of initial display, but remain compliant for the entire duration of their presence on screen. This protects users from over-disclosure, supports audit integrity, and upholds cross-jurisdictional policy boundaries in real-time, high-risk decision environments Core Workflow and Model-Agnostic Pipeline Steps 1601-1609, shown in FIG. 16, summarise the end-to-end flow from inference extraction through glyph lifecycle management. The pipeline is model-agnostic because the semantic-class mapping table is versioned per model-ID; new models are supported by uploading a signed mapping file without firmware changes.

Step 1601: Inference Extraction and Metadata Encoding—Inference outputs are collected from multiple AI systems including LLMs, LCMs, MoEs, VLMs, SLMs, SAMs, and MLMs. Each output undergoes structured metadata enrichment, which includes semantic class, confidence level, provenance, jurisdictional context, and role-bound constraints.

Step 1602: Policy Enforcement—The Rendering Controller dynamically evaluates jurisdictional and role-based policies to determine whether each inference is eligible for display. Inferences are evaluated for substitution, suppression, or delivery to appropriate user interfaces.

Step 1603: Symbolic Glyph Encoding and Selection—Eligible inference outputs are transformed into symbolic glyphs selected from a constrained, policy-approved vocabulary. Each glyph is uniquely mapped to a semantic payload and cryptographically bound to its provenance.

Step 1604: Authorized User Interaction—For users with appropriate roles and context, authorized glyphs are displayed and made interactive. Users may click, tap, or gesture over glyphs to access metadata or trigger system workflows.

Step 1605: Unauthorized Fallback Glyph Display—When the user's credentials or context do not allow for full inference visibility, the system renders a neutral or abstracted fallback glyph. These glyphs preserve workflow awareness while preventing unauthorized access.

Step 1606: Audit and Logging: All glyph interactions—permitted and suppressed—are logged in immutable, cryptographically signed records. Each log includes a timestamp, role ID, policy hash, and interaction metadata, ensuring full audit trail compliance.

Step 1607: Glyph Lifecycle Management—Glyph visibility is continuously reassessed based on updates to policy, user roles, jurisdictional changes, or new inference states. Glyphs may be automatically updated, revoked, or replaced to maintain lawful display conditions.

Step 1609: Alert-Governed Glyph Display Path—When an AI system triggers a critical alert condition, the glyph rendering pipeline may override standard policy paths. In these cases, a fallback glyph or alert marker is rendered and tagged with audit metadata, enabling escalation or supervisory review without exposing raw AI output.

(Supports Regulated Alert-Response Workflows).

Applied Glyph Vocabulary, Policy Bindings, and Exemplars

This section provides a comprehensive reference for the symbolic-glyph vocabulary used throughout the invention, together with five fully worked examples that demonstrate policy bindings, fallback logic, and multimodal rendering behaviors. Tables are provided in-line to furnish structural support and to emphasize the concrete data structures.

Master Glyph Vocabulary

TABLE

Canonical glyph classes and their default render attributes. "Permissible Substitutions" represents the first-choice downgrade when policy requires abstraction.

| Glyph ID | Semantic Class | Default Hue | Risk Tier | Default Animation | Permissible Substitutions | Jurisdiction Tags |
|---|---|---|---|---|---|---|
| 0x001 | CRITICAL-INTERVENTION | Red #FF0000 | Tier-4 | Pulse 1.2 Hz | 0x042 (MEDICAL-ALERT) | HIPAA, FDA, JCAHO |
| 0x042 | MEDICAL-ALERT | Amber #FFAA00 | Tier-3 | Blink 0.8 Hz | 0x055 (GEN-ALERT) | HIPAA |
| 0x055 | GEN-ALERT | Yellow #FFC800 | Tier-2 | Static | — | None |
| 0x101 | DATA-AUDIT-EVENT | Blue #007BFF | Tier-2 | Static 50% opacity | 0x150 (GEN-NOTICE) | GDPR, HIPAA |
| 0x150 | GEN-NOTICE | Grey #CCCCCC | Tier-1 | None | — | None |
| 0x231 | LOGI-TEMP-EXCURSION | Amber #FFAA00 | Tier-2 | Slow blink | 0x250 (LOGI-NOTICE) | FDA, EU GDP |
| 0x250 | LOGI-NOTICE | Grey #CCCCCC | Tier-1 | None | — | None |
| 0x330 | VITALS-TREND | Red #FF3333 | Tier-3 | Oscillate | 0x055 | HIPAA |
| 0x401 | COMFORT-CARE | Purple #9B59B6 | Tier-1 | Gentle pulse 0.5 Hz | 0x150 | HIPAA |

Policy-Binding Schema

Policy bindings are represented as JSON objects embedded in each glyph header. A representative schema is shown below:

```
{
  "glyph_id": "0x001",
  "policy_hash": "baf0...9ce",
  "allowed_roles": ["PHYSICIAN", "ICU_NURSE"],
  "restricted_roles": ["ADMIN", "VISITOR"],
  "jurisdictions": ["HIPAA"],
  "risk_tier": 4,
  "fallback_id": "0x042"
}
```

This schema is CBOR-encoded in the provenance tag and evaluated in real-time by the DFA-based Policy Engine Examples of Applied Glyphs Example 1 "Intubation Recommended" Critical-Care Glyph A high-confidence airway-risk model triggers a Critical Intervention glyph: red hue, 1.2 Hz pulse, provenance signature SHA-3-256=0x9f . . . e2 signed by the hospital AI governance key. Fallback glyph ID=0x042 ("MEDICAL-ALERT") if viewer lacks ICU credential.

| "INTUBATION RECOMMENDED" (Glyph 0x001) | |
|---|---|
| Attribute | Value |
| Glyph ID | 0x001 |
| Semantic Class | CRITICAL-INTERVENTION |
| Colour/Anim. | Red, pulse 1.2 Hz |
| Confidence | 95% |
| Jurisdiction | HIPAA - ICU context |
| Allowed Roles | Physician, ICU Nurse, Emergency Tech |
| Fallback Glyph | 0x042 (MEDICAL-ALERT) |
| Provenance Sig. | SHA-3-256 0x9f...e2 |

Fallback Logic. If viewer V Allowed Roles, engine substitutes glyph 0x042 and logs eventtype=ROLE_DENY with reason code RC-17 (Insufficient Clinical Privilege).

Multimodal Rendering. Auditory—250 ms high-tone triple-beep. Haptic—three quick vibrations on authorised smart badge.

Example 2 "PATIENT DATA PRIVACY" Alert A GDPR compliance monitor emits a blue lock-and-eye glyph with static 50% opacity animation. Non-authorised viewers receive glyph ID 0x101 ("DATA-AUDIT-EVENT").

| "PATIENT DATA PRIVACY" (Glyph 0x101) | |
|---|---|
| Attribute | Value |
| Glyph ID | 0x101 |
| Semantic Class | DATA-AUDIT-EVENT |
| Colour/Anim. | Blue, 50% static opacity |
| Confidence | 99% |
| Jurisdiction | GDPR - EU hospital |
| Allowed Roles | Compliance Officer, DPO, CMIO |
| Fallback Glyph | 0x150 (GEN-NOTICE) |
| Provenance Sig. | SHA-3-256 0x6d...88 |

Fallback Logic. Unauthorised viewers receive glyph 0x150 plus tooltip "Data access audit event-insufficient privileges." Ledger records event_type=JURIS_DENY.

Example 3 "COLD-CHAIN INTEGRITY" Logistics Advisory IoT sensor breach triggers amber thermometer-box glyph. Viewer roles filtered per Logistics-ManagerACL; others see grey package-question glyph 0x231.

| "COLD-CHAIN INTEGRITY" (Glyph 0x231) | |
|---|---|
| Attribute | Value |
| Glyph ID | 0x231 |
| Semantic Class | LOGI-TEMP-EXCURSION |
| Colour/Anim. | Amber, slow blink |
| Confidence | 92% |
| Jurisdiction | FDA, EU GDP |
| Allowed Roles | Logistics Mgr, QA Supervisor, Reg. Officer |
| Fallback Glyph | 0x250 (LOGI-NOTICE) |
| Provenance Sig. | SHA-3-256 0xa4...1b |

Fallback Logic. Warehouse staff see glyph 0x250; driver handhelds receive haptic pulse+voice cue: "Temperature excursion logged; supervisor notified."

Example 4 "SEPSIS RISK ESCALATION" Clinical Alert Bloodstream-infection glyph (flashing red, 2 Hz) with interactive drill-down. Confidence=97%; provenance links vitals trend glyph ID 0x330.

| "SEPSIS RISK ESCALATION" (Glyph 0x330) | |
|---|---|
| Attribute | Value |
| Glyph ID | 0x330 |
| Semantic Class | VITALS-TREND (High-Risk) |
| Colour/Anim. | Flashing red, 2 Hz |
| Confidence | 97% |
| Jurisdiction | HIPAA, JCAHO |
| Allowed Roles | Attending Physician, ICU Specialist, Resident MD |
| Fallback Glyph | 0x042 |
| Provenance Sig. | SHA-3-256 0xc2...49 |

Interactive Drill-Down. Authorized users tap glyph to spawn subordinate trend glyphs 0x331-0x334 (heart-rate, temp, blood-pressure, WBC). Each subordinate glyph inherits the parent provenance root.

Example 5 "FAMILY VISIT-COMFORT & PRIVACY" Nursing Protocol Purple hand-and-eye glyph with gentle 0.5 Hz pulse visible only to assigned ICU nurses. Visitors receive neutral comfort-care glyph 0x401.

| "FAMILY VISIT-COMFORT & PRIVACY" (Glyph 0x401) | |
|---|---|
| Attribute | Value |
| Glyph ID | 0x401 |
| Semantic Class | COMFORT-CARE + PRIVACY |
| Colour/Anim. | Purple, gentle pulse 0.5 Hz |
| Confidence | Direct physician order (100%) |
| Jurisdiction | HIPAA + Internal Policy EOL v4.0 |
| Allowed Roles | Assigned ICU Nurse, Charge Nurse, Nurse Mgr |
| Fallback Glyph | 0x150 |
| Provenance Sig. | SHA-3-256 0x7e...d0 |

Fallback Logic. Visitors or unauthorised staff see neutral comfort-care glyph 0x150 with tooltip "Comfort care scheduled-details restricted." System logs event_type=VISITOR_VIEW for audit.

Each example demonstrates the system's ability to honour role, jurisdiction, and risk simultaneously while preserving workflow continuity.

Cross-Example Fallback Matrix

Fallback hierarchy ensuring no unlawful disclosure while preserving workflow situational awareness.

| Original Glyph | Fallback Tier-1 | Fallback Tier-2 | Trigger Condition |
|---|---|---|---|
| 0x001 | 0x042 | 0x055 | Role denial, risk tier downgrade |
| 0x101 | 0x150 | — | Jurisdiction block |
| 0x231 | 0x250 | — | Device unsupported, role denial |
| 0x330 | 0x042 | 0x055 | Risk re-classification, role change |
| 0x401 | 0x150 | — | Visitor view, policy timeout |

Each table and data field herein corresponds to concrete, machine-readable structures instantiated in the firmware and policy databases described earlier, thereby providing full written-description support and demonstrating a specific, technical data-management improvement.

Technical Improvement Over Prior Art

The disclosed architecture relocates policy enforcement from application software to a deterministic hardware-accelerated DFA, thereby reducing worst-case policy-evaluation latency from milliseconds to nanoseconds. It compresses information bandwidth by an average of 85% (text→glyph) and introduces a self-describing, cryptographically bound visual primitive that remains interpretable across devices-capabilities absent in explainability dashboards and static icon sets of the prior art.

Technical Advantages of the Invention

The disclosed system delivers a concrete improvement in the functioning of computer graphics and security subsystems by relocating policy enforcement and render eligibility decisions from application software to a deterministic, hardware-accelerated layer that executes adjacent to the GPU command processor. By evaluating policy on token batches prior to pixel emission, the architecture eliminates the latency and jitter associated with application-layer redaction filters and prevents unauthorised content from ever entering the display pipeline. In bench embodiments described herein, the deterministic finite-state automaton (DFA) evaluates visibility in ≤4 ns per token and issues a permit/deny decision within a single frame budget, which is a material, measurable enhancement over prior art systems that apply policy after rendering or at the user-interface level.

A further technical advantage is bandwidth and memory efficiency. Rendering by reference to compact glyph identifiers, rather than verbose text strings or raster imagery, reduces display-bus traffic by more than thirty percent in exemplary configurations, and compresses information bandwidth by approximately eighty-five percent when transforming text to glyph indices. Because candidate glyphs are formed and validated in VRAM-resident structures (the Session Context Block and Visibility Mask), the system minimises PCIe transfers and alleviates VRAM-to-CPU thrashing, thereby lowering power draw and improving thermal headroom on constrained devices.

The invention also provides verifiable provenance and auditability at pixel granularity. Each permitted symbol is hashed together with its decision payload, policy hash, and session nonce to form an Evidence Capsule that is written to an append-only Justification Ledger. The Symbolic Audit Infrastructure can deterministically replay a user's on-screen state by traversing ledger entries, yielding a pixel-accurate reconstruction for forensic review. This capability does not exist in conventional dashboards or text renderers and directly supports legal admissibility, incident response, and compliance audits without intrusive instrumentation of the application layer.

The device-aware rendering stack confers robustness across heterogeneous displays. Through a Device Profile Registry and a per-glyph Renderability Matrix, the renderer adapts assets and animation to hardware constraints and security posture (e.g., disabling gradients and motion on SECURE_HIGH devices). A compiled rendering grammar, evaluated each frame, prevents unsafe co-occurrence patterns and enforces perceptual safety limits (e.g., mutually exclusive colour pulses). In augmented-reality contexts, a dedicated command queue that is pre-emptible on policy violation guarantees that stale or downgraded glyphs cannot persist, improving both safety and user trust.

Reliability under adverse conditions is improved through a structured fallback pathway. The Fallback Registry encodes pre-approved substitutions with semantic-fidelity scores and associated policy justifications; the FallbackTrigger Engine ensures that rendering failures, jurisdictional blocks, or role downgrades never result in silent omissions. Instead, the system renders a policy-compliant substitute or placeholder and records the downgrade event in the Glyph Event Ledger. This behaviour maintains workflow continuity without compromising confidentiality.

The architecture enhances cognitive performance in time-critical settings by presenting machine inferences as semantically compressed, policy-scoped glyphs optimised for rapid recognition. In measured embodiments, mean time-to-cognition for glyphs is approximately 420 ms versus 1980 ms for narrative text when measured from DMA fence to first user action. Coupled with the Risk-Bounded Dynamic Rendering engine, which modulates salience and dwell time as clinical or operational risk escalates, the system reduces attentional load while maintaining strict governance of disclosure.

The security model is strengthened end-to-end. Workstations boot under measured launch, bind the Secure Render Scheduler to TPM registers, watermark all pixels with session and policy identifiers, and require that each render call be signed by a device certificate. Upstream, the Regulated Output Pipeline verifies model signatures against institutional PKI before any inference is eligible for transcoding. Together these controls implement a zero-trust path from model output to photon emission, resistant to spoofing, screenshot tampering, and unauthorised replay.

Importantly, these improvements are achieved without modifying the underlying inference engines. By interposing a model-agnostic mapping table and trie-based semantic classifier, new or updated models can be onboarded by distributing signed mapping files, avoiding costly retraining or application rewrites. The policy evaluator's DFA and the rendering grammar's CNF representation are compiled artefacts that can be hot-swapped under change control, enabling rapid adaptation to evolving regulations and institutional policies while preserving deterministic run-time characteristics.

Scalability and serviceability are inherent to the chosen structures. The DFA runs from on-chip SRAM with O(1) transition cost; the Visibility Filter evaluates on the order of ten thousand glyphs per second per stream; and the Justification Store employs an LSM-tree replicated via Raft to sustain high write throughput with strong durability. These choices yield predictable performance under load and facilitate horizontal scaling across multi-GPU nodes and clustered audit back-ends.

From a claims-support perspective under 35 U.S.C. § 112, the application discloses algorithms (such as S-1, P-1), concrete data structures (GlyphTrie, Session Context Block, Evidence Capsule), and specific interconnections among hardware elements (co-processor resident at the GPU command processor, secure workstations with TPM-bound schedulers). As drafted, the terms "policy-evaluation engine," "glyph selector," and "visibility filter" connote definite structure by reference to these algorithms and storages, avoiding indefiniteness and ensuring that any means-plus-function language is paired with sufficient corresponding structure in the specification.

Finally, by enforcing policy at the render boundary and by binding what is shown to why it was permitted, the system addresses the core § 101 concern that claims may be directed merely to information presentation. Here, the claimed improvements are rooted in computer technology: deterministic, sub-frame policy computation; bus-level bandwidth reduction; context-elastic, device-aware rendering controls; and cryptographically verifiable replay of pixel states. These are not field-of-use limitations or drafting tricks; they are architectural choices that measurably enhance the operation of computing systems in ways unattainable by prior art dashboards, explainability overlays, or static iconography.

CONCLUSION

The systems and methods disclosed provide a concrete, technology-centric solution for governing the last millisecond of the AI pipeline, transforming raw inference tokens into policy-compliant symbolic glyphs through a deterministic, hardware-anchored rendering layer. By coupling a DFA-based policy evaluator with device-aware rendering grammar, immutable provenance capture, and audited fallback pathways, the invention improves computer operation (latency, bandwidth, security, and replayability) while enabling lawful, role-scoped human cognition in high-stakes environments. The described architecture is model-agnostic and deployable across heterogeneous hardware and display modalities without altering the underlying inference engines.

Those skilled in the art will appreciate that numerous variations and extensions can be made without departing from the scope of the appended claims. Illustrative, non-limiting examples include substituting alternative finite automata or decision structures for policy evaluation (e.g., compiled BDDs, table-driven RBAC/ABAC graphs), relocating components across CPU/GPU/FPGA or edge/cloud boundaries, replacing cryptographic primitives and ledgers with functionally equivalent mechanisms, adapting the rendering grammar to additional modalities (haptics, audio beacons, projector-based AR), and integrating domain-specific taxonomies or regulatory ontologies. Likewise, data paths may be re-pipelined, caches re-partitioned, or transport protocols swapped to meet performance or regulatory constraints understood by practitioners in graphics, security, and safety-critical UI engineering.

The embodiments described herein are presented to enable implementation and to provide written-description support under 35 U.S.C. § 112; they are not intended to limit claim scope. Unless expressly stated otherwise, the terms "comprise," "include," and their variants are used in an open, non-exclusive sense, the order of operations is not limiting, ranges and thresholds encompass intermediate values, and "processor" covers CPUs, GPUs, TPUs, FPGAs, and ASICs. Any claim element drafted under § 112(f) (e.g., using "means for") shall be construed to cover the corresponding structures, materials, and algorithms disclosed and their statutory equivalents; functional elements not invoking § 112(f) are supported by the specific modules and algorithms described. Program instructions may reside on non-transitory computer-readable media; mere signals in transit are excluded. Accordingly, the scope of the invention is defined solely by the claims and their lawful equivalents.

What is claimed is:

1. A computer system for policy-constrained symbolic rendering of artificial-intelligence (AI) outputs, comprising:
   a) an AI accelerator having an output first-in/first-out (FIFO) buffer that emits inference tokens as (token identifier, confidence, domain tag) tuples;
   b) a graphics processor including a command processor and a single-instruction multiple-data (SIMD) co-processor coupled to the command processor;
   c) a policy-evaluation co-processor implemented in the SIMD co-processor and operable to execute a deterministic finite automaton (DFA) stored in a non-transitory memory, the DFA receiving the tuples from the FIFO and, prior to emission of any pixel values, outputting a permit/deny decision together with a visibility mask that constrains presentation attributes;
   d) a glyph selector comprising lookup tables that map permitted tuples to entries of a constrained glyph dictionary, each entry specifying a glyph identifier, semantic class, and allowed substitutions;
   e) a provenance tagger operable to compute a cryptographic hash over at least the glyph identifier, a policy identifier associated with the DFA state, a session nonce, and a checksum of the tuples, thereby producing an evidence capsule bound to the glyph identifier;
   f) a device-aware renderer coupled to a device profile registry and a rendering grammar, the device-aware renderer selecting a renderable asset for the glyph identifier only if the visibility mask and the rendering grammar permit co-occurrence on the target device profile; and
   g) a justification ledger implemented as an append-only log that records, for each displayed glyph, the evidence capsule and a timestamp generated by a monotonic hardware clock;
   wherein the permit/deny decision and evidence-capsule binding in elements (c)-(e) are executed within the graphics processor prior to writing any pixelvalues to a frame buffer, thereby preventing unauthorised tokens from entering a display pipeline and reducing rendering bandwidth by representing outputs as glyph identifiers instead of text or raster imagery.

2. The system of claim 1, wherein the DFA is compiled from a machine-readable policy graph that encodes user role, jurisdictional rule set, institutional policy, and minimum confidence thresholds, and wherein each DFA acceptance state generates the visibility mask.

3. The system of claim 1, wherein the device profile registry stores, for each device class, at least maximum pixel dimensions, colour depth, refresh rate, and security level, and each glyph entry carries a renderability matrix bit-mask that is AND-ed with the device profile to determine render, substitute, or suppress.

4. The system of claim 1, wherein the rendering grammar is compiled into conjunctive-normal-form (CNF) constraints that prohibit unsafe or policy-inconsistent co-occurrences and animations within a frame.

5. The system of claim 1, further comprising a substitution handler that, responsive to a deny decision or renderability failure, replaces the glyph identifier with a substitute from a policy-constrained substitution map having an associated semantic-fidelity score, and records a downgrade reason in the justification ledger.

6. The system of claim 1, further comprising a secure render scheduler executing on a workstation that boots with measured launch, verifies a device certificate and platform-configuration-register value prior to rendering, and overlays a visible watermark comprising a session identifier, policy version, and timestamp on displayed glyphs.

7. The system of claim 1, wherein the graphics processor maintains a pre-emptible command queue for augmented-reality (AR) rendering, and stale or downgraded glyphs are pre-empted and replaced within a frame upon a policy change.

8. The system of claim 1, further comprising a risk-class evaluator that maps telemetry or context signals to a risk tier and a dynamic render governor that adjusts at least one of pulse frequency, hue, dwell time, and acknowledgement requirements according to the risk tier.

9. The system of claim 1, wherein the justification ledger is replicated across nodes and a replay engine deterministically reconstructs historical display states by re-rendering glyph identifiers constrained by the recorded visibility masks and device profiles.

10. A computer system for policy-constrained symbolic rendering of artificial-intelligence (AI) outputs, comprising:

a) an inference processor having an output buffer that emits inference data including at least a token identifier and confidence, and optionally one or more classification tags;
b) a graphics processor including a command processor and a parallel-processing coprocessor coupled to the command processor;
c) a policy-evaluation engine implemented in or adjacent to the graphics processor and operable to execute a deterministic state machine stored in a non-transitory memory, the state machine receiving the inference data from the output buffer and, prior to any presentation output, outputting an authorization decision together with a visibility mask or equivalent constraint data that constrains presentation attributes;
d) a symbol selector comprising data structures that map permitted inference data to entries of a constrained symbol dictionary, each entry associating a symbol identifier with a semantic class and one or more policy-approved substitutions;
e) a provenance tagger operable to compute a cryptographic signature or hash over data comprising the symbol identifier, a policy identifier associated with the state machine decision, a session nonce, and data derived from the inference output, thereby producing an evidence capsule bound to the symbol identifier;
f) a context-aware renderer in communication with a device or context profile registry and a rendering grammar or equivalent constraint set, the context-aware renderer selecting a renderable asset for the symbol identifier only upon satisfaction of the visibility constraints and rendering constraints for the target context; and
g) a justification ledger implemented as an immutable record that records, for each displayed symbol, the evidence capsule and a timestamp from a trusted monotonic time source;
wherein the authorization decision and evidence-capsule binding in elements (c)-(e) are executed within the graphics subsystem prior to presentation or output to a display device, thereby preventing unauthorized inference data from entering a presentation pipeline and reducing rendering bandwidth by representing outputs as compact symbol identifiers rather than verbose text or raster imagery.

11. The system of claim 10, wherein the deterministic state machine is compiled from a machine-readable policy graph that encodes at least user role, jurisdictional and institutional policy, confidence thresholds, and/or context parameters, and wherein each acceptance state or equivalent authorization condition generates the visibility constraints.

12. The system of claim 10, wherein the device or context profile registry stores, for each device class, attributes describing display and security capabilities, and each symbol entry carries a renderability data structure evaluated against the profile to determine render, substitute, or suppress.

13. The system of claim 10, wherein the rendering grammar is compiled into a formal constraint representation that prohibits unsafe or policy-inconsistent co-occurrences and animations within a presentation interval.

14. The system of claim 10, further comprising a substitution handler that, responsive to an authorization denial or renderability failure, replaces the symbol identifier with a substitute from a policy-constrained substitution mapping with associated fidelity metadata, and records a substitution or downgrade rationale in the justification ledger.

15. The system of claim 10, further comprising a secure render scheduler executing in a secure computing environment that verifies platform integrity, verifies device identity and platform integrity data prior to rendering, and overlays provenance metadata including session, policy, and time information on displayed symbols.

16. The system of claim 10, wherein the graphics processor maintains a preemptible command queue for AR or other real-time rendering, and stale or downgraded symbols are preempted and replaced within a presentation interval upon a policy change.

17. A computer-implemented method for policy-constrained symbolic rendering of artificial-intelligence (AI) outputs, comprising:
receiving, from an inference processor output buffer, inference data including at least a token identifier and confidence, and optionally classification tags;
executing, on parallel-processing circuitry of a graphics processor and from a deterministic state machine stored in non-transitory memory, a policy evaluation that consumes the inference data and, prior to any presentation output, generates an authorization decision together with a visibility mask or equivalent constraint data that constrains presentation attributes;
selecting, via a symbol selector, an entry of a constrained symbol dictionary that maps permitted inference data to a symbol identifier, a semantic class, and one or more policy-approved substitutions;
computing, by a provenance tagger, a cryptographic integrity or authenticity value over data comprising the symbol identifier, a policy identifier associated with a state machine decision, a session nonce, and data derived from the inference output to produce an evidence capsule bound to the symbol identifier;
determining, by a context-aware renderer in communication with a device or context profile registry and a rendering grammar or equivalent constraint set, a renderable asset for the symbol identifier only when the visibility constraints and rendering constraints for the target context are satisfied; and
appending, to a tamper-evident justification record, for each displayed symbol, the evidence capsule together with a timestamp from a trusted monotonic time source;
wherein the authorization decision and the evidence-capsule binding are executed within the graphics processor prior to any presentation output, thereby preventing unauthorized inference data from entering a presentation pipeline and reducing rendering bandwidth by representing outputs as compact symbol identifiers rather than verbose text or raster imagery.

18. The method of claim 17, wherein the deterministic state machine is compiled from a machine-readable policy graph that encodes at least user role, jurisdictional and institutional policy, confidence thresholds, and/or context parameters, and wherein each acceptance state or equivalent authorization condition generates the visibility constraints.

19. The method of claim 17, wherein the device or context profile registry stores, for each device class, attributes describing display and security capabilities, and each symbol entry carries a renderability data structure evaluated against the profile to determine render, substitute, or suppress.

20. The method of claim 17, wherein the rendering grammar is compiled into a formal constraint representation that prohibits unsafe or policy-inconsistent co-occurrences and animations within a presentation interval.

21. The method of claim 17, further comprising, responsive to an authorization denial or renderability failure, replacing, by a substitution handler, the symbol identifier with a substitute from a policy-constrained substitution mapping with associated fidelity metadata, and recording a substitution or downgrade rationale in the justification ledger.

22. The method of claim 17, further comprising executing a secure render scheduler in a secure computing environment that verifies platform integrity, verifies device identity and platform integrity data prior to rendering, and overlays provenance metadata including session, policy, and time information on displayed symbols.

23. The method of claim 17, wherein the graphics processor maintains a preemptible command queue for AR or other real-time rendering, and stale or downgraded symbols are preempted and replaced within a presentation interval upon a policy change.

\* \* \* \* \*